United States Patent
Jain et al.

(10) Patent No.: US 11,030,547 B2
(45) Date of Patent: Jun. 8, 2021

(54) SYSTEM AND METHOD FOR INTELLIGENT INCIDENT ROUTING

(71) Applicant: Microsoft Technology Licensing, LLC, Redmond, WA (US)

(72) Inventors: Navendu Jain, Seattle, WA (US); Vivek Jain, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 937 days.

(21) Appl. No.: 15/706,010

(22) Filed: Sep. 15, 2017

(65) Prior Publication Data

US 2019/0087746 A1    Mar. 21, 2019

(51) Int. Cl.
*G06N 20/00* (2019.01)
*G06Q 30/00* (2012.01)
*G06N 5/02* (2006.01)

(52) U.S. Cl.
CPC ............ *G06N 20/00* (2019.01); *G06N 5/022* (2013.01); *G06Q 30/016* (2013.01)

(58) Field of Classification Search
None
See application file for complete search history.

(56) References Cited

U.S. PATENT DOCUMENTS

| | | | |
|---|---|---|---|
| 9,548,883 B2 | 1/2017 | Ijidakinro et al. | |
| 9,582,408 B1 * | 2/2017 | Jayaraman | G06Q 10/06 |
| 9,736,308 B1 * | 8/2017 | Wu | H04M 3/5233 |
| 2012/0066547 A1 * | 3/2012 | Gilbert | H04L 41/5074 714/26 |
| 2014/0180738 A1 | 6/2014 | Phillipps et al. | |
| 2014/0325254 A1 * | 10/2014 | Mani | G06F 16/285 714/2 |
| 2015/0142720 A1 | 5/2015 | Beechuk et al. | |

(Continued)

OTHER PUBLICATIONS

"Eyeshare Notification and Escalation", https://ayehu.com/product/eyeshare-notification-and-escalation/, Retrieved on: May 24, 2017, 4 pages.

(Continued)

*Primary Examiner* — Alan Chen
(74) *Attorney, Agent, or Firm* — Fiala & Weaver P.L.L.C.

(57) ABSTRACT

Methods for automatic and intelligent incident routing are performed by systems and apparatuses. The methods intelligently optimize routing of incidents to correct owners from a pool of many possible owners by utilizing learning models and algorithms based on feature vectors. Users provide information related to incidents of services or systems. The information is cleaned and featurized to generate a feature vector for the incident. The systems and apparatuses intelligently and automatically determine sets of candidate recipients based on outputs of algorithms, e.g., machine learning algorithms, such as classifiers using the feature vectors as inputs. Classifiers may utilize models or algorithms trained with featurizations used for feature vectors. Sets of candidate recipients are provided to users for selection of a recipient for the information from the set of candidate recipients instead of from all the possible recipients. Methods for intelligent bug and feedback routing are also performed by systems and apparatuses.

20 Claims, 8 Drawing Sheets

(56) References Cited

U.S. PATENT DOCUMENTS

| | | | |
|---|---|---|---|
| 2015/0170153 A1 | 6/2015 | Sloan et al. | |
| 2016/0239487 A1* | 8/2016 | Potharaju | G06F 16/24578 |
| 2016/0337295 A1* | 11/2016 | Bennett | G06Q 10/06 |
| 2017/0111505 A1* | 4/2017 | McGann | H04M 3/5235 |
| 2017/0111509 A1* | 4/2017 | McGann | H04M 3/5232 |
| 2017/0255876 A1* | 9/2017 | Malatesha | G06Q 10/00 |
| 2018/0039914 A1* | 2/2018 | Menahem | G06N 5/048 |
| 2018/0285768 A1* | 10/2018 | Karuppasamy | H04L 41/0631 |
| 2018/0367370 A1* | 12/2018 | Tapia | H04L 41/5067 |
| 2019/0116265 A1* | 4/2019 | Avila | H04L 51/02 |

OTHER PUBLICATIONS

"ServiceNow Incident Management", https://www.servicenow.com/content/dam/servicenow/documents/datasheets/ds-inc-prb-21030103.pdf, Published on: Mar. 21, 2015, 2 pages.

Mathad, Ashwini, "Incident routing", https://docs.bmc.com/docs/display/public/bsr30/Incident+routing, Published on: Nov. 25, 2014, 2 pages.

Petouhoff, Natalie L., "The Forrester Wave: Customer Service SoftwareSolutions, Q4 2008", http://www.promero.com/pdf/forrester-customer-service-wave-q42008.pdf, Published on: Oct. 21, 2008, 39 pages.

"Deep Structured Semantic Model", https://www.microsoft.com/en-us/research/project/dssm/, Published on: Jan. 30, 2015, 2 pages.

\* cited by examiner

SYSTEM AND METHOD FOR INTELLIGENT INCIDENT ROUTING

BACKGROUND

Incident management systems are used by support engineers across cloud service providers to create and track a broad range of service issues including high priority and customer impacting incidents. The fundamental goal of these systems is to deliver high service availability by quickly mitigating/resolving incidents to minimize the customer impact. However, a wide variety of root causes for problems and a large number of possible teams (e.g., hundreds or thousands) to which an incident could be assigned cause incidents to often be mis-routed and repeatedly reassigned, switching ownership assignments across various teams before an incident reaches the correct owning team. In some cases, a mis-routing for an incident adds three or more hours to TTE (e.g., Time-to-Engage) the incident by the correct owning team, which in turn adds at least this many additional hours to TTM (e.g., Time-to-Mitigate) for the incident.

SUMMARY

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

Methods for automatic and intelligent incident routing using, e.g., machine learning, are performed by systems and apparatuses. The methods intelligently optimize routing of incidents to correct owners from a pool of many possible owners by utilizing learning models and algorithms based on feature vectors. An information provider (e.g., a user, an engineer, an administrator, an automated mechanism such as a "bot", and/or the like) provides information related to an incident of a service or system. The information is cleaned, normalized, and featurized to generate a feature vector for the incident. The systems and apparatuses intelligently and automatically determine sets of candidate recipients based on outputs of classifiers using the feature vectors as inputs. Classifiers may comprise machine learning models/algorithms and may utilize models and/or algorithms trained with featurizations used for the feature vector. Sets of candidate recipients are provided to information providers for a selection of a recipient for the information from the set of candidate recipients. Methods for intelligent bug and feedback routing are also performed by systems and apparatuses.

In one example, a method performed in a computing device is provided. The method may be performed for intelligent routing of incidents, bugs, feedback, etc., (i.e., issue routing), as described herein. In embodiments, the method includes receiving information from an information provider related to an issue associated with at least one of a system or service associated with the information provider, and processing the information according to at least one featurization operation to generate a feature vector. The method also includes providing the feature vector to a machine-learning model/algorithm that automatically determines a set of candidate recipients, that contains fewer than all possible candidate recipients, based on the feature vector, and providing the set of candidate recipients as one or more options for a selection of a recipient for the information from the set.

In another example, a system is provided. The system may be configured and enabled in various ways to perform intelligent incident, bug, and/or feedback routing (i.e., issue routing), as described herein. The system includes one or more memories configured to store program logic for automatic, intelligent issue routing. The system also includes a processor(s) configured to access the memory(ies) and to execute the program logic. The program logic includes featurization logic configured to apply featurization to information according to at least one featurization operation to generate a feature vector, the information received from an information provider and related to an issue related to at least one of a system or service associated with the information provider. The program logic also includes model/algorithm logic configured to provide the feature vector to a machine-model/algorithm that automatically determines a set of candidate recipients, that contains fewer than all possible candidate recipients, based on the feature vector, and to provide the set of candidate recipients as one or more selectable options for a recipient of the information.

In still another example, a computer-readable program storage device has computer program instructions recorded thereon that, when executed by a processing device, performs a method. The method may be for automatic, intelligent issue routing, as described herein. The program instructions featurization instructions configured to apply featurization to information according to at least one featurization operation to generate a feature vector. The information is received from an information provider and related to an issue associated with at least one of a system or service associated with the information provider. The program instructions also include model/algorithm instructions configured to provide the feature vector to a machine-learning model/algorithm that automatically determines a set of candidate recipients based on the feature vector, and to provide the set of candidate recipients as one or more selectable options for a recipient of the information. The program instructions further include interface instructions configured to provide an interface to the information provider. The interface may be configured to receive the information from the information provider and to provide the set of candidate recipients.

These and other objects, advantages and features will become readily apparent in view of the following detailed description of examples of the invention. Note that the Brief Summary and Abstract sections may set forth one or more, but not all examples contemplated by the inventor(s). Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate examples of the present application and, together with the description, further explain the principles of the example embodiments and to enable a person skilled in the pertinent art to make and use the example embodiments.

Figure 1:
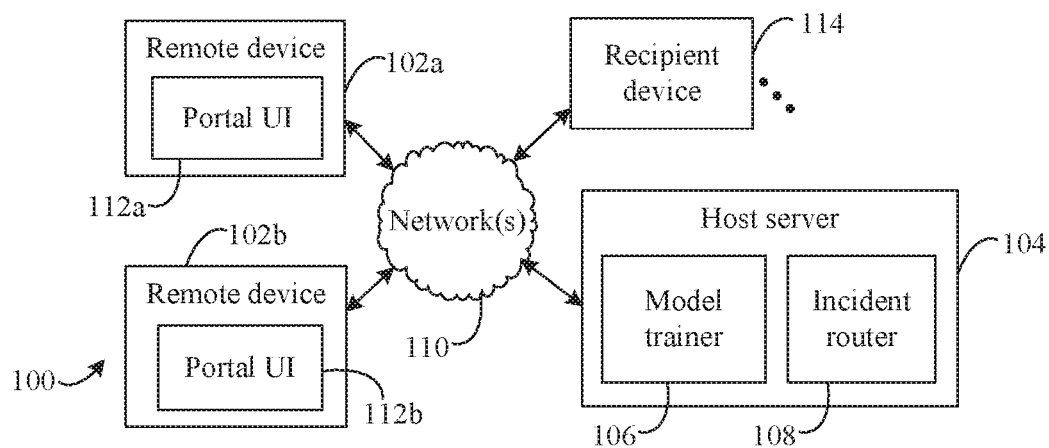
FIG. 1 shows a block diagram of a networked system for intelligent incident routing, according to an example embodiment.

The features and advantages of the examples described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an example embodiment," "an example," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for intelligent incident routing and modeling. In particular, Subsection A describes example intelligent routing embodiments, and Subsection B describes example modeling embodiments.

Section III below describes an example mobile device that may be used to implement features of the example described herein.

Section IV below describes an example processor-based computer system that may be used to implement features of the example described herein.

Section V below describes some additional examples and advantages.

Section VI provides some concluding remarks.

II. Example Embodiments

The example techniques and embodiments described herein are provided for illustrative purposes, and are not limiting. The embodiments described herein may be adapted to any type of electronic and/or processing device, as well as systems thereof. Further structural and operational embodiments, including modifications/alterations, will become apparent to persons skilled in the relevant art(s) from the teachings herein.

The techniques and embodiments described herein provide for intelligently and automatically routing "issues," such as but not limited to, incidents, bugs, feedback, etc., to their respective, correct owners (e.g., recipients designated with handling the issue). Hosts and providers of systems and services that are utilized and/or accessed by users, customers, engineers, and/or the like ("users" herein) may employ support staff such as support engineers or other specialists either directly or indirectly via third parties. Issues may be reported by such users or by automated mechanisms such as "bots." As referred to herein, an "information provider" may be any type of user or automated mechanism for providing information related to issues. Automated mechanisms may report on issues such as incidents periodically based on scheduling, or prior to the next scheduled time based on higher severity issues. Often times, the systems and services are many in number, e.g., hundreds and thousands, and are varied in scope, leading to hundreds and thousands of specific support teams to handle issues with different systems and services. When users are not able to select the correct recipient from a list of so many possible owners for issue reporting, mis-routing can occur which increases TTE and TTM and can negatively impact the user.

For example, a user of a system or a service, e.g., a cloud-based service, may have an issue with the behavior, features, operations, and/or the like, of the system/service, and this issue may impact the productivity or business functions of the user—such an issue is also referred to as an incident herein. The host and/or provider of the system or service may desire to return the user to normal operations and productivity levels as soon as possible to avoid negative impacts to users and/or their businesses. However, the nature of the incident requires that the correct owner of the issue receive the incident information for resolution, and as noted above, there may be hundreds or thousands of possible recipients. That is, specific issues may best, or only, be handled by specific support groups having specialized knowledge for these specific issues. Similarly, routing for bug reporting, another type of "issue" (e.g., for software/hardware development projects or by users), as well as feedback routing, another type of "issue," related to resolutions of incidents or bugs, include similar considerations for determining the correct recipient. When the correct owner for an issue does not receive notice of the issue quickly, the TTE increases—that is, the time-to-engage the issue and begin resolution by the correct support group is negatively impacted by mis-routings of issues to incorrect owners/support groups. Likewise, if a support group that is not the correct owner receives an issues and begins work for resolution thereof, this group may not provide a correct solution or may spend time on the issues before realizing the issues should be re-routed to a different, correct owner, again impacting the TTE. This in turn also increases the TTM for issues, i.e., mitigating issues may be directly impacted by mis-routings. In embodiments, the TTM may be considered as the time from the submission of an issue It should be noted that while embodiments herein are directed to various types of issues and information providers, these embodiments are described in the context of automatic and intelligent, user-reported incident routing for purposes of discussion and illustration. The described user/incident context is not to be considered limiting of any embodiments or equivalents herein.

The embodiments described herein provide for several techniques for properly and automatic routing of issues, such as incidents, in an intelligent manner. Such techniques allow for scaling to large numbers of services, handling unstructured user inputs, and making accurate routing decisions based on limited information. For instance, to scale to large numbers of services, an incident management system may be configured to provide incident tracking workflows for hundreds to thousands of services where each service in turn may have several associated support teams or groups. In embodiments, for users or automated mechanisms creating an incident in a portal of the incident management system as described below, the incident management system is configured to overcome difficulties in scrolling through multitudes of listed services listed to find the right system/service/team to which the incident should be assigned by allowing for intelligent and automatic routing of incidents. Because there may not be enough information available at the time of incident creation to manually identify the correct issue owner/team by the user (e.g., a user notes specific system or service performance issues but, the underlying root cause could have been a problem in network, storage, other broad sets of services, etc.), the described techniques and embodiments provide an architecture configured to automatically accomplish such a task based on a machine-learning algorithms that consume feature vectors for provided information.

The described embodiments and techniques may perform intelligent and automatic routing of incidents based on providing structure for unstructured inputs from users during incident creation. That is, unstructured, free form text inputs provided by a user for the incident data (e.g., title, detailed description, error messages, logs, and/or the like), requires significant time to be consumed to manually read the large volume of text, particularly when support engineers do not have sufficient insights into all possible services/teams to which the incident should be assigned. The embodiments herein provide for incident management systems configured to featurize unstructured text through featurization operations, thus providing structure, for the application of the machine-learning algorithms noted above. In embodiments, a featurization operation is an operation that transforms at least a portion of information, e.g., the unstructured text, into one or more representations that describe characteristics a portion(s) of the information.

The described embodiments and techniques may also perform intelligent and automatic routing of incidents based on limited information received from users. That is, accurate routing decisions for incidents are provided according to embodiments, despite a user providing little information regarding the incident. For instance, in addition to providing a high level tag for a given incident (e.g., 'Severity 0-4'), incident management system embodiments herein are configured to provide 'actionable,' fine-granularity information of what specific feature area needs attention, and, correspondingly, what service/team should be selected to receive the incident.

A. Example Embodiments for Intelligent Routing

Accordingly, systems, apparatuses, and devices may be configured and enabled in various ways for intelligent and automatic routing of incidents. For example, FIG. 1 is a block diagram of a system 100, according to embodiments. System 100 is a computing system for intelligent and automatic routing of incidents, according to an embodiment. As shown in FIG. 1, system 100 includes a remote device 102*a*, a remote device 102*b*, a recipient device 114, and a host server 104, which may communicate with each other over a network 110. It should be noted that the number of remote devices and host servers of FIG. 1 is exemplary in nature, and greater numbers of each may be present in various embodiments. Additionally, any combination of components illustrated may comprise a system for intelligent and automatic routing of incidents, according to embodiments.

Remote device 102*a*, remote device 102*b*, recipient device 114, and host server 104 are configured to be communicatively coupled via network 110. Network 110 may comprise any type of connection(s) that connects computing devices and servers such as, but not limited to, the Internet, wired or wireless networks and portions thereof, point-to-point connections, local area networks, enterprise networks, and/or the like.

Host server 104 may comprise one or more server computers, which may include one or more distributed or "cloud-based" servers. Host server 104 is configured to receive incident information provided by a user, e.g., via a portal UI 112*a* and/or portal UI 112*b*, respectively from remote device 102*a* and/or remote device 102*b* via network 110. As illustrated, host server 104 includes a model trainer 106 and an incident router 108. In embodiments, host server 104 is configured to provide portals, such as portal UI 112*a* and/or portal UI 112*b*, to remote device 102*a* and/or remote device 102*b* via network 110. Host server 104 is also configured to train a machine-learning algorithm according to model trainer 106, according to embodiments. Such machine-learning algorithm may be utilized to determine recipients for incidents created by users via portal UI 112*a* and/or portal UI 112*b*. In embodiments, host server 104 is configured to utilize the machine-learning algorithm with incident router 108, described in further detail below, to intelligently and automatically route the incidents to the correct recipient(s).

Remote device 102a and remote device 102b may be any type of computing device or computing system, including a terminal, a personal computer, a laptop computer, a tablet device, a smart phone, etc., that may be used to execute portals/UIs, e.g., via portal UI 112a and/or portal UI 112b, and allow a user to enter information for incidents therein. For instance, as shown in FIG. 1, remote device 102a includes portal UI 112a, and remote device 102b includes portal UI 112b. Remote device 102a and remote device 102b are configured to respectively activate or receive portal UI 112a and portal UI 112b locally or remotely to enable a user to enter incident data that is used to perform intelligent and automatic routing of incidents. In embodiments, remote device 102a and/or remote device 102b may include a stored instance of a portal, as described above, received from host server 104.

Recipient device 114 may be any type of computing device or computing system, including a terminal, a personal computer, a laptop computer, a tablet device, a smart phone, etc., that may be used by recipients, e.g., technical support staff, technicians, engineers, etc., to handle issues such as incidents. Recipient device 114 may be configured to solve/mitigate issues via input from recipients, may be configured to communicate messages to remote device 102a and/or remote device 102b, and may be configured to provide feedback for issues from recipients to host server 104. While a single recipient device 114 is illustrated for brevity and clarity, it is contemplated herein that any number of recipient devices 114 for possible, candidate, and selected recipients may be present in various embodiments As noted above, incident router 108 is configured to perform intelligent and automatic routing of incidents using machine-learning algorithms, e.g., according to a classification model/algorithm for incidents received from users in some embodiments, although other types of models/algorithms are contemplated herein. Incidents (or other types of issues such as bugs, feedback, etc.) may include information input by a user via a portal, as described herein, that describes a problem with, inquiry for, etc., a service or system the user accesses. As noted above, a user may not know with which specific service or system the incident is associated, and/or which owner/support group should be responsible for handling the incident. As a non-limiting example embodiment, incident router 108 is configured to determine a set of candidate recipients using, e.g., featurization techniques/operations for the incident information from the user and a classifier, e.g., a machine learning classifier, with a machine-learning algorithm to consume featurized information and generate the set of candidate recipients. The set of candidate recipients may be provided to user as the user inputs the incident information, in an embodiment. Incident router 108 may also be configured to provide prompts to the user via a portal for additional information to determine possible recipients as the user enters the incident information.

Model trainer 106 is configured to train models, such as but not limited to, machine-learning algorithms like classification models/algorithms, or a combination of models such as rule based and machine learning based, to be used for performing intelligent and automatic routing of incidents. In embodiments, model trainer 106 is configured to train machine-learning algorithms offline for deployment, according to one or more featurization operations used by incident router 108 for structuring input data. Model trainer 106 is configured to train models using machine learning techniques and instance weighting, in an embodiment, and as discussed in further detail below.

Accordingly, remote device 102a, remote device 102b, recipient device 114, and/or host server 104 are configured to utilize one or more aspects of incident management systems for intelligent and automatic routing of incidents. Remote device 102a, remote device 102b, recipient device 114, and host server 104 may be configured and enabled in various ways to perform these functions.

Figure 2:
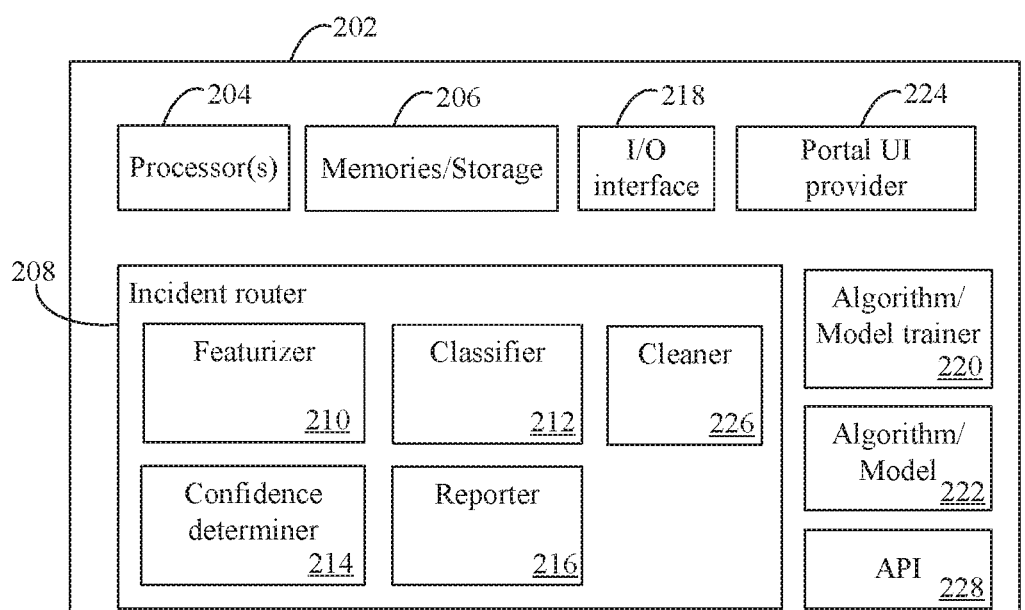
FIG. 2 shows a block diagram of a computing system for intelligent incident routing, according to an example embodiment.

For instance, FIG. 2 is a block diagram of a system 200, according to an embodiment. System 200 may be a computing system for intelligent and automatic routing of incidents, in embodiments. As shown in FIG. 2, system 200 includes a computing device 202 which may be referred to as a computing system. System 200 may be a further embodiment of system 100 of FIG. 1, and computing device 202 may be a further embodiment of host server 104, remote device 102a, and/or remote device 102b of FIG. 1. Computing device 202 may be any type server computer or computing device, as mentioned elsewhere herein, or as otherwise known. As shown in FIG. 2, computing device 202 includes one or more of a processor ("processor") 204, one or more of a memory and/or other physical storage device ("memory") 206, an input/output (I/O) interface 218, and an incident router 208 which may be an embodiment of incident router 108 of FIG. 1. System 200 may also include a model trainer 220 (which may be an embodiment of model trainer 106 in FIG. 1), a model 222 (e.g., an algorithm, according to embodiments), a portal UI provider 224, and an API component 228. System 200 may also include additional components (not shown for brevity and illustrative clarity) such as, but not limited to, a portal/UI, as well as those described below with respect to FIGS. 9 and 10, e.g., an operating system.

Processor 204 and memory 206 may respectively be any type of processor circuit or memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 is configured to execute computer program instructions such as but not limited to embodiments of incident router 208, e.g., as computer program instructions for intelligent and automatic routing of incidents, etc., as described herein, and memory 206 is configured to store such computer program instructions, as well as to store other information and data described in this disclosure, including but without limitation, model 222, issues created by information providers, etc.

I/O interface 218 may be any type of wired and/or wireless network adapter, modem, etc., configured to facilitate computing device 202 to communicate with other devices over a network, e.g., such as communications between host server 104, remote device 102a and/or remote device 102b described above with respect to FIG. 1.

Model trainer 220 is configured to machine-train models/algorithms, such as but not limited to, classification, regression, comparison-matching, clustering, word embeddings (e.g., for feature compression), feature selection, and/or the like, to be used for performing intelligent and automatic routing of incidents. The terms "model" and "algorithm" may be used interchangeably herein in the context of machine-learned models/algorithms Several embodiments herein may be generally described in the context of classifiers and machine-learning algorithms for classification, however, such description is for purposes of illustration and description and is not to be considered limiting. Where an embodiment refers to a classifier, a machine-learning classifier, or a classification, an equivalent component and/or determination for other machine-learning algorithms noted herein, and their equivalents, is also contemplated.

Classification models/algorithms may be trained, offline in some embodiments, for deployment, according to one or more featurization operations used by incident router 208 for structuring input data, and model trainer 220 may be configured to train models using machine learning techniques and instance weighting, according to embodiments. In embodiments, classification models may be or may comprise algorithms, such as machine-learning algorithms, for automatically and intelligently determining recipients for issue routing. Further details concerning model trainer 220 are provided below.

Model 222 may be trained by model trainer 220, according to embodiments. Model 222 may be a classification model utilized for classifying issues, such as but without limitation, incidents, bugs, feedback, and/or the like, for proper routing to recipients (e.g., support groups/teams) for handling. Model 222 may be trained, e.g., offline, using data/information from prior issues received and/or using a priori information. For instance, a classification model may be trained on incident information provided by one or more users for previously submitted incidents, feedback information for previously submitted incidents from users or support teams, performance metrics, etc., as well as deduced information (e.g., when an incorrect recipient is chosen from a determined set of two or more candidate recipients, it may be inferred that one of the other candidate recipients is the correct recipient). In the context of information associated with incidents received from users for training, model 222 may be trained with one or more featurization operations used by incident router 208 for structuring input data, e.g., as feature vectors (described in further detail below). In this way, the training for model 222 closely corresponds to feature vectors utilized by incident router 208 for classification of incidents.

Featurization operations for training of models, such as model 222, may include, without limitation, a K-means clustering featurization for grouping similar features, a keyword/keyphrase featurization for determining the presence of keywords/keyphrases, a context-based featurization, a semantic-based featurization (e.g., including domain-specific information and terms such as, but not limited to, global unique identifiers (GUIDs), universal resource locators (URLs), emails, error codes, customer/user identities, geography, times/timestamps, and/or the like), an n-gram featurization, a char-gram featurization, a feature selection featurization (including count-based feature selection to keep the most frequently used terms and remove less frequently used terms, and/or correlation-based feature selection to calculate the similarity of each feature to input labels and keep the most important features as calculated by the correlation), and/or the like. As noted above, in embodiments, a featurization operation is an operation that transforms at least a portion of information, e.g., the unstructured text, into one or more representations that describe characteristics a portion(s) of the information.

According to embodiments, model 222 may comprise one or more models or templates, as described herein, and may be stored by memory 206. Model 222 may be incrementally, or wholly, updated by model trainer 220 based on feedback, additional incidents received, and/or the like.

Portal UI provider 224 is configured to provide a portal UI, e.g., portal UI 112a and/or portal UI 112b of FIG. 1, to remote devices for creation and entry of incidents and incident information. Portals UIs may be provided by portal UI provider 224 via I/O interface 218. For instance, a user may navigate to a web address or URL, etc., in a web browser associated with an incident management system such as system 200. Portal UI provider 224 is configured to provide the portal or UI of the web page/URL for the user to create an incident and enter relevant information therefor. Further details for exemplary portals/UIs is provided below with respect to FIGS. 4A-4B.

API component 228 may comprise one or more APIs configured to interface with machine-learning models/algorithms, as described herein, for training models/algorithms used for automatic and intelligent issue routing. For example, API component 220 may be configured to interface with multiple models in parallel to train models/algorithms. It should also be noted that API component 220 and/or APIs included therein may be invoked by any systems and components of systems herein, according to embodiments.

Incident router 208, as illustrated, includes a plurality of components for performing the techniques described herein for intelligent and automatic routing of incidents. As shown, incident router 208 includes a featurizer 210, a classifier 212, a confidence determiner 214, a reporter 216, and a cleaner 226. While shown separately for illustrative clarity, in embodiments, one or more of featurizer 210, classifier 212, confidence determiner 214, reporter 216, and/or cleaner 226 may be included together with each other and/or as a part of other components of system 200. Additionally, as previously noted, while classifier 212 is exemplarily illustrated for clarity and brevity, this component may be substituted for, or other machine-learning components may be additionally included for, a regression component, a clustering component, a comparison-matching component, etc. Likewise, classification logic may be an equivalent representation of a classifier in embodiments, and other types of machine-learning algorithm logic, or machine-learning algorithm logic generally, are also contemplated for embodiments.

Confidence determiner 214 may be configured to determine a confidence value for potential candidate recipients of issues. Confidence values may be compared to a threshold confidence value or otherwise evaluated to determine if a candidate recipient should be recommended to an information provider for an issue. For instance, a determination may be made as to how many features of a feature vector correspond to and/or highly correlate with a given potential recipient, where a higher correspondence/correlation equates to a higher confidence value, and a lower correspondence/correlation equates to a lower confidence value. In embodiments, the confidence values may be determined by confidence determiner 214 based on recipients for prior issues that are similar to the current issue. Similarity of issues may be based at least in part on words or phrases in prior issue titles that are common to the title of the current issue. For instance, in determining a confidence value, confidence determiner 214 may reference one or more similar prior issues having words or phrases in their respective titles that are common to the current issue. If there is a match between a determined candidate recipient for the current issue and a recipient of a prior issue, the confidence value for a matched candidate recipient may be increased, e.g., from "Medium" to "High." Likewise, if no match is present, the confidence value for a candidate recipient may be decreased, e.g., from "Medium" to "Low." In embodiments, by way of illustrative example, a threshold may be set at a "Medium" confidence level (or any other level for any other value scale), so if a confidence value is "Medium" or "High," the candidate recipient will be recommended to the information provider. Candidate recipients may be recommended to information providers via an interface, e.g., a user interface, as described herein.

Reporter 216 may be configured to provide re-route indications of mis- and/or incomplete-routings for issues to classifier 212. Reporter 216 may also be configured to determine and provide metrics related to an issue to model trainer 220. Metrics for an issue may include TTE, TTM, a number of mis-routings, portions of information provider and/or recipient feedback, issue information, and/or the like.

Cleaner 226 of FIG. 2 may be configured to perform cleaning operations on the information. Cleaning operations may include one or more of character or word removal (including tags for markup and/or programming languages and long base64 strings, e.g., for image text), lemmatization, whitespace condensing, and/or, case normalization, and may be performed to provide initial structure to unstructured information, e.g., textual information, and to remove extraneous characters and/or redundancies from the information.

Further details regarding these and other components of incident router 208 are provided elsewhere herein, including as follows.

Figure 3:
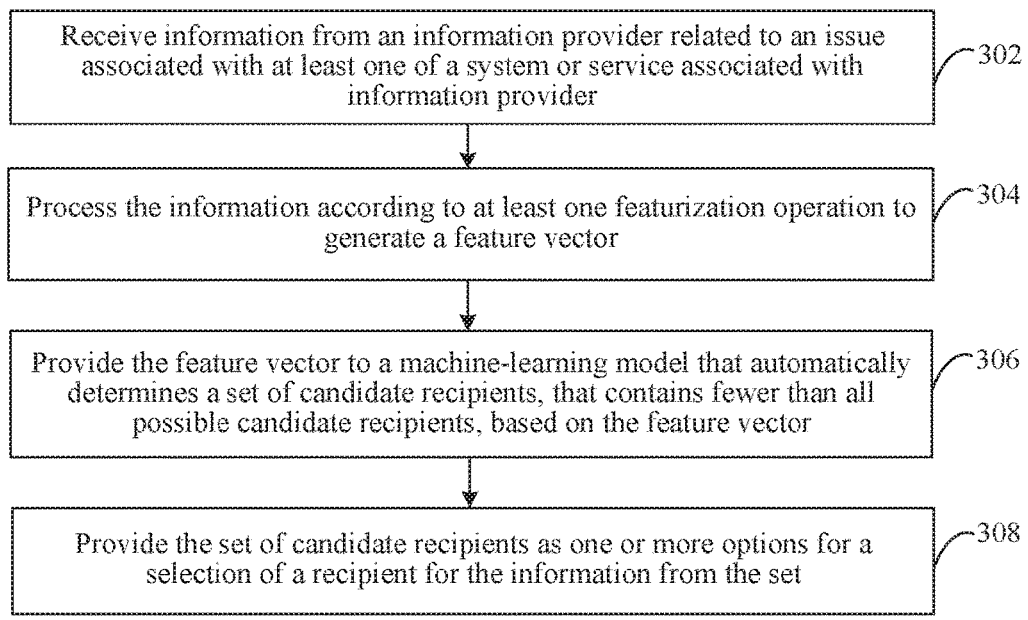
FIG. 3 shows a flowchart for intelligent incident routing, according to an example embodiment.

Referring also now to FIG. 3, a flowchart 300 for performing intelligent and automatic routing of incidents is shown, according to an example embodiment. For purposes of illustration, flowchart 300 of FIG. 3 is described with respect to system 200 of FIG. 2 and its subcomponents, and also with reference to FIGS. 4A-4B (described below). That is, system 200 of FIG. 2 may perform various functions and operations in accordance with flowchart 300 for intelligent and automatic routing of incidents. Further structural and operational examples will be apparent to persons skilled in the relevant art(s) based on the following description.

Figure 4A:
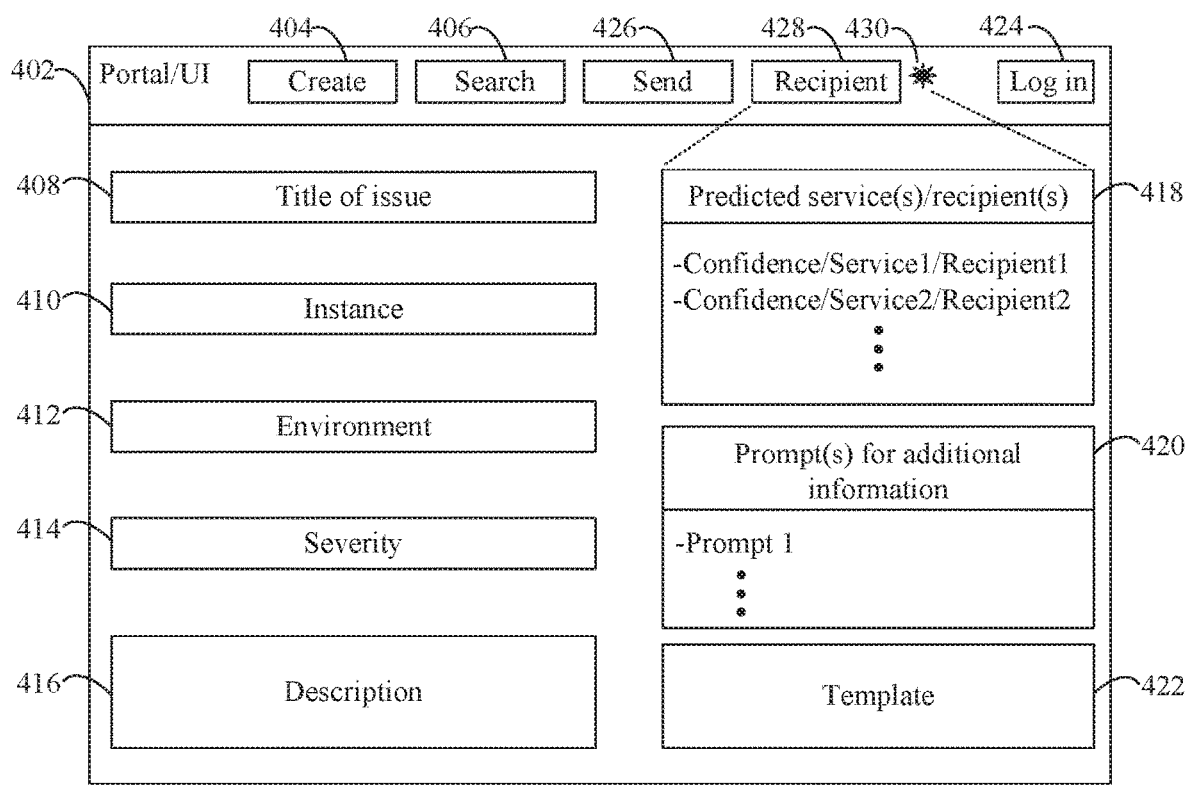
FIG. 4A shows an interface for intelligent incident routing, according to an example embodiment.

As noted, system 200 of FIG. 2 and flowchart 300 of FIG. 3 are described with reference to FIGS. 4A-4B. In FIG. 4A, a block diagram is shown of an interface 400A from which user input for issues, e.g., incidents, bugs, feedback, etc., may be received for intelligent and automatic routing of incidents, according to an example embodiment. Interface 400A includes a portal UI 402. In embodiments, portal UI 402 may be a further embodiment of portal UI 112a and/or portal UI 112b of FIG. 1 and may be provided by portal UI provider 224 of FIG. 2. In embodiments, a remote device, e.g., remote device 102a and remote device 102b of FIG. 1, and/or computing device 202 may be configured to activate or receive portal UI 402 locally or remotely to enable a user to enter incident data that is used to perform intelligent and automatic routing of incidents. In embodiments, a remote device may include a stored instance of a portal, as described above, received from a host server such as host server 104 and/or computing device 202.

While interface 400A is illustrated as including a UI, it is contemplated herein that other interfaces may be used for interactions with automated mechanisms for reporting issues and subsequent intelligent and automatic routing thereof.

In embodiments, portal UI 402 may include selectable options for creating issues such as incidents, e.g., a create button 404 or the like, for searching created issues such as incidents, e.g., a search button 406, and for using credentials to access the portal UI 402, e.g., a login button 424. Portal UI 402 may also include one or more fields for entry of issue information, e.g., incident information that may comprise text fields, pull-down menus, radio buttons, and/or the like, as would be understood by persons of skill in the relevant art having the benefit of this disclosure. Selectable options such as links are also contemplated herein. While certain fields are shown, embodiments contemplate fewer and additional fields, and those shown in FIG. 4A are not to be considered limiting.

As illustrated, portal UI 402 includes a title field 408 in which a user may enter text designating a title for the issue, and an instance field 410 in which the user may enter text or select an option for an instance of the issue (e.g., a cloud instance associated with an incident). Portal UI 402 also includes an environment field 412 where a user may enter text or select an option designating the environment in which the issue occurred, and a severity field 414 where a user may enter text or select an option designating the severity for the issue. A description field 416 is also shown. In description field 416, a user may enter text, log files, screenshots and other images, and/or other information and/or attachments describing the issue. In embodiments, these described fields may be populated in portal UI 402 after a user logs in and creates, or searches for, an issue. A user may also update an issue that is searched for by adding, deleting, and/or modifying information in the fields described above.

The embodiment of portal UI 402 in FIG. 4A also includes a prediction field 418, a prompt field 420, and a template field 422. Prediction field 418 may be configured to display one or more services, systems, and/or recipients for the issue created by the user in portal UI 402. The items displayed in prediction field 418 may be provided by incident router 208 of FIG. 2, according to embodiments. For instance, as noted above, confidence determiner 214 may determine that one or more candidate recipients should be recommended to an information provider for an issue, as discussed in additional detail below with respect to FIG. 5. The services, systems, and/or recipients displayed may be selectable by the user, and may be incorporated into the issue information (e.g., incident information) and/or used to direct the issue to the correct recipient. Recommendations may be provided to the information provider upon creation of the issue and entry of issue information, as described herein, after the information provider has selected a candidate recipient, and/or at a later time to transfer an issue to a new recipient after a previous candidate recipient has been sent the issue.

In embodiments, an alert or highlighting of recommended candidate recipients may be included associated with prediction field 418, e.g., color highlighting, animations, icons, pop-up boxes, animation, font changes and/or font effects, and/or the like. For instance, an alert icon 430 may be displayed, highlighted, etc., to alert the information provider that a recommended recipient(s) is provided. In embodiments, prediction field 418 may be displayed, e.g., within portal UI 402 or as a pop-up box, etc., when the information provider selects or hovers over a button such as a prediction button 428, or selects or hovers over alert icon 403. Prediction field 418 (or equivalent pop-up box, etc.) may include selectable options or may include a button to confirm selection of recommendations. Additionally, a confidence score, e.g., as determined by confidence determiner 214 of FIG. 2, may also be associated with recommendations in prediction field 418 (or equivalent pop-up box, etc.), according to embodiments. Confidence scores may be based on any scale, and may be descriptive (e.g., using words such as "High," "Medium," "Low," and/or the like), numerical (e.g., 1 to 5, 1 to 10), etc. An information provider may also be prompted, or provided selectable options, for feedback regarding the recommendations (not shown). In embodiments, an information provider may reject one or more recommendations by providing negative feedback or selecting a negative feedback option. In other embodiments, an information provider may be enabled to modify recommendations, e.g., a different recipient within a recommended service. Furthermore, confidence scores may be presented with indications of portions of the issue information used to determine the confidence score.

In some embodiments, activating a tab or button, such as prediction button 428, may cause the display of a screen or tab in portal UI 402 for selection of recommended candidate recipients. Such embodiments may be in addition to, or in lieu of, prediction field 418. Referring now to FIG. 4B, a block diagram is shown of an interface 400B from which candidate recipients for issues, e.g., incidents, bugs, feedback, etc., may be selected and/or determined for intelligent and automatic routing of incidents, according to an example embodiment. Interface 400B includes a portal UI 432. In embodiments, portal UI 432 may be a further embodiment of portal UI 112a and/or portal UI 112b of FIG. 1, and/or of portal UI 402 of FIG. 4A, and may be provided by portal UI provider 224 of FIG. 2 (as illustrated with components of UI portal 402 described above). In embodiments, a remote device, e.g., remote device 102a and remote device 102b of FIG. 1, and/or computing device 202 may be configured to activate or receive portal UI 432 locally or remotely to enable a user to select a candidate recipient to perform intelligent and automatic routing of incidents. In embodiments, a remote device may include a stored instance of a portal, as described above, received from a host server such as host server 104 and/or computing device 202.

While interface 400B is illustrated as including a UI, it is contemplated herein that other interfaces may be used for interactions with automated mechanisms for reporting issues and subsequent intelligent and automatic routing thereof.

As illustrated, portal UI 432 may allow an information provider to select a candidate recipient based on recommended candidate recipients for an issue, or to select a new recipient for transfer of an issue. Portal UI 432 may include a prediction field 434, which may be an embodiment of prediction field 418. Prediction field 434 may include selectable options or may include a button to confirm selection of recommendations. Additionally, a confidence score, e.g., as determined by confidence determiner 214 of FIG. 2, may also be associated with recommendations in prediction field 434, according to embodiments. Confidence scores may be based on any scale, and may be descriptive (e.g., using words such as "High," "Medium," "Low," and/or the like), numerical (e.g., 1 to 5, 1 to 10), etc. In embodiments, an alert or highlighting of recommended candidate recipients may be included associated with recommended options in prediction field 434, e.g., color highlighting, animations, icons, pop-up boxes, animation, font changes and/or font effects, and/or the like. For instance, an icon similar to alert icon 430 may be displayed, highlighted, etc., to alert the information provider that a given recipient(s) is recommended based on a highest confidence value. Furthermore, confidence scores may be presented with indications of portions of the issue information used to determine the confidence score.

An information provider may also be prompted, or provided selectable options, for feedback regarding the recommendations as illustrated in prediction field 434. In embodiments, an information provider may reject one or more recommendations by providing negative feedback or selecting a negative feedback option. In other embodiments, an information provider may be enabled to modify recommendations, e.g., a different recipient within a recommended service.

Prediction field 434 may also include a search field 436 in which an information provider may search for services, support groups, support group personnel, etc., to provide additional information for candidate recipients and services to facilitate determination of a recipient(s) to be selected.

Referring back to FIG. 4A, prompt field 420 may be configured to provide prompts, e.g., from incident router 208, for additional/corrected information inputs from the user as the issue information is entered via portal UI 402. The user may be enabled to enter the information associated with the prompt in prompt field 420, or in an appropriate one of title field 408, instance field 410, environment field 412, severity field 414, and/or description field 416. In embodiments, the prompts provided may include data from sources or links to sources by which the information provider may obtain the additional/corrected information. Such sources may include frequently-asked questions (or links therefor accessible via a network), technical support reference information (or links therefor accessible via a network), and/or the like. In some embodiments, the prompts may be associated with information corresponding to a label for an issue that is new or is not similar to/associated with a prior issue (e.g., in such cases where a candidate recipient set is an empty set and candidate recipients cannot be recommended without additional information).

Template field 422 may include a selectable option for the user to create a template or template link associated with the issue or type of issue. For example, if the user frequently submits incidents, bugs, and/or feedback, etc., for a specific system or service, a template may be created for later use by the user. Templates may leverage and include any information from any field used to enter issue information, information determined by incident router 208 of FIG. 2 according to the embodiments herein, as well as prior issues submitted by the user.

Portal UI 402 may also include a selectable option for sending an issue to a recipient, e.g., a send button 426. That is, an issue may be provided to a selected recipient by activation of send button 426, according to embodiments.

Flowchart 300 of FIG. 3 is described as follows. In particular, in step 302, information from an information provider related to an issue associated with at least one of a system or service associated with information provider is received. For instance, as noted above, a user may enter issue information, e.g., incident information, via portal UI 402. A title for the issue may be entered in title field 408 designating a title for the issue, and an instance of the issue (e.g., a cloud instance associated with an incident) may be entered for selected via instance field 410. In environment field 412, a user may enter text or select an option designating the environment in which the issue occurred, and a user may enter text or select an option designating the severity for the issue in severity field 414. In description field 416, a user may enter descriptive information related to the issue.

Such information may be provided to and received by incident router 208 of FIG. 2 as it is entered by the user. In embodiments, the issue information may be received by incident router 208 at any time(s) subsequent to the creation of the issue (e.g., simultaneously, substantially simultaneous, after a period of time from the last entry of information by the user, periodically, and/or the like), and may include any information included in the fields described herein as well as an identification number assigned to the issue at its creation.

In step 304, the information is processed according to at least one featurization operation to generate a feature vector.

For example, featurizer 210 of FIG. 2 may be configured to generate a feature vector for an issue based on information provided and received in step 302. Featurizer 210 may be configured to perform one or more featurization operations such as, but not limited to, a K-means clustering featurization, a keyword featurization, a context-based featurization, a semantic-based featurization, an n-gram featurization, a char-gram featurization, and/or a feature selection featurization. Feature vectors generated may comprise any number of feature values (i.e., dimensions) from tens, hundreds, thousands, etc., of feature values in the feature vector. As noted above, in embodiments, a featurization operation is an operation that transforms at least a portion of information, e.g., the unstructured text, into one or more representations that describe characteristics a portion(s) of the information. As an illustrative example, featurizer 210 may take the information, or a portion thereof, as an input and perform a featurization operation to generate a representative output value(s)/term(s) associated with the type of featurization performed, where this output may be an element(s)/dimension(s) of the feature vector.

For instance, clustering may be based on a fixed "K" thread or may be based on dynamically determined "K" threads for processing based on cohesiveness of the data provided. Additionally, any number of keywords (or keyphrases) may be used by featurizer 210 in determining a keyword portion of the feature vector (e.g., any number of Boolean entries for pre-determined keywords either being present or not present in the information).

Context- and semantic-based featurization may also be performed by featurizer 210 to provide structure to unstructured information that is received. In embodiments, featurizer 210 may utilize the SysSieve learning system from Microsoft Corporation of Redmond, Wash., for semantic-based featurizations. For example, semantic-based feature sets may be extracted by featurizer 210 for technical phrases from the issue information provided by the information provider. Sematic-based features sets may comprise, without limitation, domain-specific information and terms such as global unique identifiers (GUIDs), universal resource locators (URLs), emails, error codes, customer/user identities, geography, times/timestamps, and/or the like. The use of semantic-based featurization for domain-specific features provides rich, discriminative sets of features that improve accuracy in service/recipient determinations.

N-gram and char-gram featurizations may also be implemented to determine numbers of word and/or character groups present in the information, and count- and/or correlation-based feature selection as featurization may also be performed by featurizer 210 on text associated with the information received in step 302 to determine if system/service features are present and designate such system/service features in the feature vector.

For instance, a feature vector may be created using the above featurizations (e.g., featurization operations) by setting a bit(s) and/or a value in the feature vector for descriptive issue information and for results of the featurization steps described herein, e.g., if a key phrase/word is present in the issue information. The feature vector is then scored using the trained model and artificial intelligence and machine learning (AML), as described herein.

In step 306, the feature vector is provided to a machine-learning model that automatically determines a set of candidate recipients, that contains fewer than all possible candidate recipients, based on the feature vector. For instance, the machine-learning model may be a classifier, e.g., classifier 212 of FIG. 2, which may be configured to automatically determine a set of candidate recipients based on the feature vector generated in step 304. In embodiments, a feature vector for an issue is received from featurizer 210 by classifier 212. Classifier 212 then processes the feature vector according to an algorithm or model to generate the set of candidate recipients. The set of candidate recipients may also include a corresponding service/system for each recipient where the service/system is determined by classifier 212 based on the feature vector generated in step 304. According to embodiments, classifier 212 may be a machine-learning classifier that utilizes machine learning techniques based on a learning model or classification model, described in further detail below. In some embodiments, a candidate recipient set may be determined to be an empty set by classifier 212 where candidate recipients cannot be recommended to information providers without additional information. In such cases, prompts may be provided to the information provider, as described in further detail herein, for information corresponding to a label for the issue (e.g., in such cases where the issue is new or is not similar to/associated with a prior issue).

In step 308, the set of candidate recipients is provided as one or more options for a selection of a recipient for the information from the set, e.g., instead of from said all possible candidate recipients. For instance, classifier 212 of FIG. 2 may be configured to provide the set of candidate recipients. In embodiments, the set of candidate recipients may be provided to prediction field 418 of UI 402 as an option for selection by the user. That is, one or more candidate recipients in the set may be presented for selection as the recipient for the issue. In embodiments where the set of candidate recipients includes more than one candidate recipient, a listing of candidate recipients may be provided to and presented in prediction field 418. In embodiments, a predicted service for each of the candidate recipients in the set may be presented in the listing. In embodiments, selecting the recipient also selects the service, and for embodiments where a single recipient is associated with a service, selecting the service also selects the recipient.

When a recipient (and/or service) is selected from prediction field 418 and entry of issue information in portal UI 402 is completed, the issue may be provided from UI 402 to the recipient by activating send button 426.

By one or more of the steps of flowchart 300, candidate recipients are predicted for intelligent and automatic routing of issues, e.g., incidents. As noted above, the number of possible recipients for issues may vary greatly from a relatively small number to thousands of support groups, staff members, and/or engineers. The determined set of candidate recipients comprises fewer recipients than all possible recipients, and in embodiments, may comprise only a small fraction of all possible recipients (e.g., 1, 2, 3, . . . , etc. candidates). By intelligently and automatically determining recipients for the routing of issues, load due to mis-routings is significantly reduced for the network utilized by technical support groups and the associated recipients. Additionally, TTE and TTM are reduced thereby improving productivity and operations of systems/services for which issues are reported.

As noted above, systems and devices may be configured and enabled in various ways to perform their respective functions according to the techniques described herein. In FIG. 5, a flow diagram 500 for performing intelligent and automatic routing of issues is shown, according to an example embodiment. For purposes of illustration, flow diagram 500 of FIG. 5 is described with respect to system 200 of FIG. 2 and its subcomponents, and also with reference to FIG. 4A-4B. That is, system 200 of FIG. 2 may perform various functions and operations in accordance with flow diagram 500 for intelligent and automatic incident routing. Flow diagram 500 may be a further embodiment of flowchart 300 of FIG. 3. Further structural and operational examples will be apparent to persons skilled in the relevant art(s) based on the following description. Flow diagram 500 is described as follows.

Flow diagram 500 may utilize various components of system 200 of FIG. 2. For example, as illustrated, featurizer 210, classifier 212, confidence determiner 214, reporter 216, model trainer 220, model 222, and portal UI provider 224 may be utilized in flow diagram 500. Flow diagram 500 may also utilize various components of interfaces 400A and 400B of FIGS. 4A-4B, such as portal UI 402 which may be a UI in embodiments, or an interface for access by automated mechanisms for information provision in embodiments.

Also illustrated in flow diagram 500 of FIG. 5 are recipients 502 which may be one or more recipients selected to receive issues according to intelligent and automatic issue routing, as described herein. In embodiments, recipients may correspond to respective recipient devices such as recipient device 114 of FIG. 1.

In step 504, model trainer 220 trains a model/algorithm ("model") configured to determine sets of candidate recipients for issues, and provides the trained model as model 222 that is deployed for use according to the techniques and embodiment for automatic and intelligent issue routing herein. As noted above, when deployed, model 222 may be saved in a memory/storage of a host server, e.g., memory 206 of computing device 202, in embodiments. In step 506, the deployed model 222 may be provided to and/or made available to classifier 212. In embodiments, classifier 212 may comprise model 222 based on provision thereof.

UI provider 224 is configured to provide a UI such as portal UI 402 (or other interface) in step 508. In step 508, portal UI 402 may be provided to an information provider via a remote device such as remote device 102a and/or remote device 102a of FIG. 1. As described with respect to FIG. 4A, portal UI 402 may be provided or activated by an information provider via a URL or the like.

In step 510, an information provider, e.g., a user, provides information for an issue via portal UI 402. In embodiments, the information is received by featurizer 210 of FIG. 2 as similarly described above in step 302 of flowchart 300. For example, a user may create a new issue, or update an existing issue, with title information, instance and environment information, a severity level, and description information. As the user enters the information in step 510, featurizer 210 may determine a feature vector at step 512, as similarly described above in step 304 of flowchart 300, and provide the feature vector to classifier 212, as similarly described above in step 306 of flowchart 300. In embodiments, featurizer 210 may update the feature vector at step 512 as information is entered by the information provider. In embodiments, an updated feature vector may be provided classifier 212 as the information is entered. In some embodiments, featurizer 210 may determine and provide the feature vector after a threshold amount of information is provided (e.g., one or more of information for an issue title, instance, environment, severity level, and/or description). The threshold amount of information may be pre-determined or may be domain-dependent, according to embodiments. For instance, in some cases the issue title and instance may be sufficient to initially determine and provide the feature vector, while in other cases, the environment may also be required. It should be appreciated, however, that any combination of one or more information portions noted above may be used for the initial determination and provision of the feature vector.

In step 514, classifier 212 may provide some potential candidates for recipients to confidence determiner 214. That is, classifier 212, receives the feature vector in step 512, and utilizes the feature vector as an input to model 222 to determine potential candidate recipients (and/or systems/services) for the issue. In embodiments, one or more candidate recipients may be provided to confidence determiner 214 in step 514 based on the processed result of the feature vector by classifier 212. Classifier 212 and/or confidence determiner 214 may be configured to determine a confidence value for potential recipients and compare this confidence value to a threshold confidence value (e.g., less than, less than or equal to, equal to, greater than or equal to, or greater than). For instance, a determination may be made as to how many features of a feature vector correspond to and/or highly correlate with a given potential recipient, where a higher correspondence/correlation equates to a higher confidence value, and a lower correspondence/correlation equates to a lower confidence value. Potential recipients meeting the comparison requirements for their confidence values to the threshold confidence value may be added to a set of candidate recipients based on an indication from confidence determiner 214 in step 520. Systems/services and/or recipients meeting a required confidence level as compared to the confidence threshold value may be provided in candidate recipient sets via portal UI 402 in step 524, as similarly described above in step 308 of flowchart 300. In embodiments, when at least one candidate recipient (and/or system/service) meets the confidence requirement for inclusion in a set, other possible recipients (or systems/services) that do not meet the confidence requirement may be excluded from and/or not included in the candidate recipient set provided in step 524. In such cases, prompts for additional information in step 516, described below, may or may not be provided, according to embodiments. In embodiments, the number of candidate recipients in a candidate recipient set may be capped or limited to a value that is predetermined, that is based on the identity of the information provider, etc. That is a top-k number of candidate recipients may be provided in a candidate recipient set, where 'k' corresponds to the value.

As noted, in embodiments, the determination of potential candidate recipient sets may be performed while issue information is being provided according to step 510 by a user or another information provider via an interface, such as portal UI 402, and/or before an issue is completed and sent to a recipient. In cases where confidence determiner 214 determines that there are no potential recipients that meet the requisite level of confidence, the information provider may be prompted via portal UI 402 in step 516 to enter additional information based on the confidence level that is determined for the potential recipients. For example, if an information provider has not entered sufficient detail to provide a required confidence for determining systems/services and/or recipients, a prompt for the additional information may be provided at step 516. In some embodiments, prompts in step 516 may be tailored to request specific types of information based on factors that cause the confidence level to be less than, less than or equal to, etc., the threshold confidence value. Based on the prompted provided in step 516, an information provider may proceed at step 518 back to step 510 to enter the requested additional information.

According to embodiments, a severity level for an issue may be determined by classifier 212 and provided at step 526 via portal UI 402, e.g., in addition to the candidate recipient set provided in step 524. Based on the provided severity level, the information provider may designate the severity level for the issue accordingly. In some embodiments, the severity level for the issue may be automatically set based on the severity level determined by classifier 212 and provided at step 526. A recommended severity level may be based on a recipient for the issue, an environment for the issue, a system/service for the issue, one or more keywords in the issue information, the presence of one or more features in the feature vector, the information provider, a number of similar issues previously submitted, and/or the like. In embodiments, an estimated indication of TTE or TTM may be also be provided to the interface, and/or included with the issue/issue information, based on severity level, recipients in the set of candidate recipients, etc.

When a recipient is selected from the candidate recipient set in step 528 and the desired issue information is entered via step 510, the issue may be provided to the recipient in step 530. For instance, the information provider may activate send button 426 of portal UI 402 to send the issue to the recipient. In some embodiments, more than one recipient may be selected from the set of candidate recipients. System 200 of FIG. 2 may facilitate the provision of the issue to the recipient from portal UI 402, according to some embodiments.

Based on the outcome of the issue being serviced, the selected recipient may provide feedback at step 536, and/or an information provider may provide feedback at step 538, to reporter 216 of FIG. 2. In some embodiments, additional services or components, e.g., model trainer 220 implementing machine learning, may also provide feedback in one or both of these steps. For instance, the selected recipient may provide feedback in step 536, e.g., as described with respect to FIGS. 4A-4B, indicating that the issue was mis-routed to the selected recipient; conversely, the feedback in step 536 may indicate that the issue was properly routed and/or that the issue was resolved by the recipient. The feedback in step 536 may indicate another recipient that the selected recipient recommends as being a new recipient or an additional recipient. The feedback in step 538 may indicate resolution of the issue, a mis-routing, a need for an additional recipient, and/or the like. In embodiments, the feedback at step 536 and/or the feedback at step 538 may also include the issue or the issue information.

Reporter 216 may be configured to provide re-route indications of mis- and/or incomplete-routings for issues to classifier 212 in step 540. In step 542, classifier 212 is configured to automatically determine a new recipient(s) for the issue based on the re-route indication from step 540. Step 542 may include a determination of the new recipient(s) based on the feature vector for the issue as well as recommended new recipients from feedback received in step 536/step 538, the candidate recipient set, and/or the re-route indication indicating the that previously selected recipient was not the correct recipient. Subsequent to the determination of the new recipient(s), the issue may be automatically provided to the new recipient(s) by classifier 212 as in step 534 above, and subsequently feedback in step 536 and/or step 538 may again be provided.

In step 544, reporter 216 of FIG. 2 may be configured to determine and provide metrics (e.g., feedback values) related to the issue to model trainer 220. Metrics for an issue may include TTE, TTM, a number of mis-routings, portions of feedback from step 536 and/or step 538, and/or the like. Model trainer 220 may be configured to use received metrics from step 544 to update model 222, wholly or incrementally, according to embodiments.

Variations on flow diagram 500 are also contemplated herein. For example, in embodiments, steps of flow diagram 500 may proceed in different orders than as illustrated in FIG. 5, steps may be repeated, steps may be omitted, steps may be performed concurrently or partially concurrently with other steps, etc., and additional steps may be also be performed. As yet another example, in embodiments, the steps of flow diagram 500 may be performed for different issues concurrently or partially concurrently.

Figure 6:
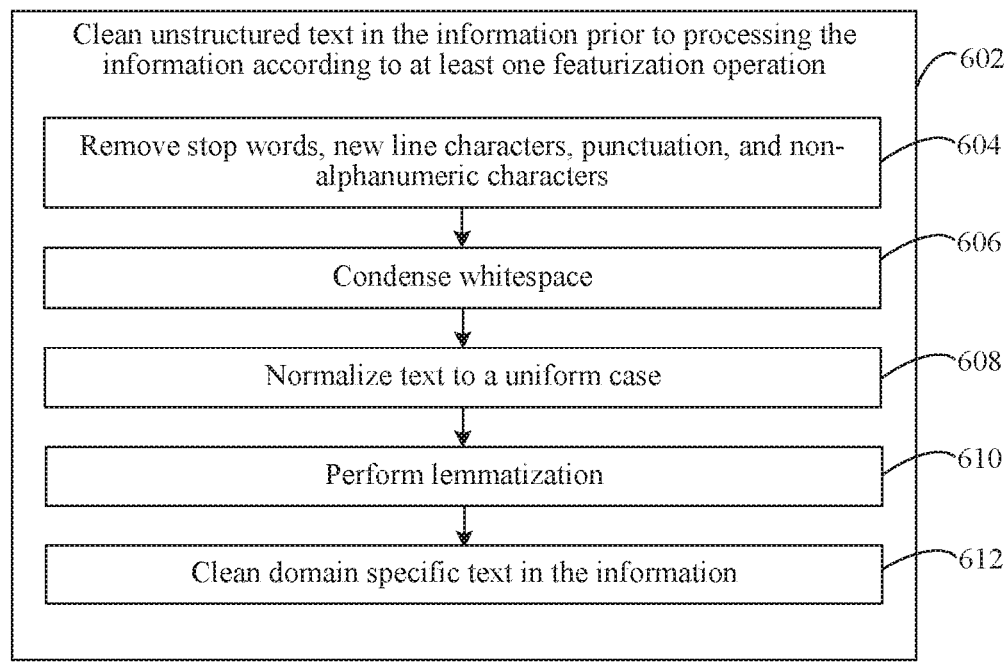
FIG. 6 shows a flowchart for intelligent incident routing, according to an example embodiment.

Referring now to FIG. 6, a flowchart 600 for performing intelligent and automatic routing of incidents is shown, according to an example embodiment. For purposes of illustration, flowchart 600 of FIG. 6 is described with respect to system 200 of FIG. 2 and its subcomponents, and also with reference to FIGS. 4A-4B. That is, system 200 of FIG. 2 may perform various functions and operations for cleaning information in accordance with flowchart 600 for intelligent and automatic routing of incidents. Flowchart 600 may be a further embodiment of flowchart 300 of FIG. 3. Further structural and operational examples will be apparent to persons skilled in the relevant art(s) based on the following description. Flowchart 600 is described as follows.

Flowchart 600 begins at step 602. In step 602, unstructured text in the information is cleaned prior to processing the information according to at least one featurization operation. For instance, as described in flowchart 300 of FIG. 3, information is received from an information provider related to an issue associated with at least one of a system or service associated with information provider (step 302), e.g., via interface 402 of FIG. 4A and/or interface 432 of FIG. 4B, and the information is processed according to at least one featurization operation to generate a feature vector (step 304). Subsequent to, or while, provision of the information, the information may be cleaned. According to embodiments, cleaner 226 of FIG. 2 may be configured to perform cleaning operations on the information. Cleaning operations may include one or more of character or word removal, lemmatization, whitespace condensing, and/or, case normalization, and may be performed to provide initial structure to unstructured information, e.g., textual information, and to remove extraneous characters and/or redundancies from the information.

It is contemplated herein that one or more of the following cleaning steps of flowchart 600 may be performed in a different order or may be omitted, in some embodiments, and/or that other cleaning operations may be performed. Step 704, step 706, step 708, step 710, and/or step 712 may be performed as part of step 702.

In step 604, stop words, new line characters, punctuation, and non-alphanumeric characters are removed. For example, cleaner 226 may be configured to remove any number of stop words such as "the," "a," "and," etc., in addition to stop words that are specific to the domain of the system (e.g., system 100 of FIG. 1 and/or system 200 of FIG. 2). Cleaner 226 may be configured to remove punctuation, e.g., commas, periods, semicolons, etc., from the information as well as any non-alphanumeric characters, in embodiments. New line characters may also be removed by cleaner 226. Such cleaning operations may simplify the data set from which a feature vector is generated.

In step 606, whitespace is condensed. For instance, removal of white space condenses the information for feature vector generation, which reduces memory footprints and necessary processing cycles, and also provides for a uniform delimiting of terms in the information. According to embodiments, cleaner 226 may be configured to perform this cleaning operation.

In step 608, the text is normalized to a uniform case. For example, cleaner 226 may be configured to normalize text in the information to a single case, e.g., either upper case or lower case. Uniform, normalized case information may allow for a simplification in generating feature vectors, as described herein.

In step 610, lemmatization is performed. For instance, cleaner 226 may be configured to perform lemmatization to reduce redundancy of words having the same root base that are used in different forms to simplify and further condense the data provided in the information, e.g., "access," "accessing," "accessed," etc., may be lemmatized to simply "access."

In step 612, domain-specific text in the information is cleaned prior to processing the information according to at least one featurization operation. For example, embodiments also provide for cleaning of domain-specific information and terms such as, but not limited to, GUIDs, URLs, emails, error codes, customer/user identities, geography, times/timestamps, and/or the like. Cleaner 226 may be configured to clean domain-specific text provided by an information provider.

The cleaned information described in flowchart 600 may be provided by cleaner 226 to featurizer 210 for featurization processing, as described herein.

Accordingly, cleaner 226 is configured to provide increased classification efficiency and decreased classification complexity to improve the performance of system 200 for generating feature vectors, determining classifications for issues, and providing sets of candidate recipients for intelligent and automatic routing of issues. That is, the cleaning operations described herein allow for a smaller memory footprint by reducing and simplifying input information, as well as reducing processing cycles required by system 200 in performance of the techniques described herein.

B. Example Embodiments for Modeling

The embodiments and techniques also provide for training and updating models/algorithms utilized by machine learning classifiers, as described herein. Embodiments and techniques may also provide for alternative configurations for training models/algorithms utilized by machine learning classifiers.

For example, a cloud-based trainer for machine learning models/algorithms executing on a cloud-based server may train and/or update models/algorithms used by classifiers based on provided data, according to embodiments. This provided data may include one or more of prior issues for systems/services, "big data," bulk data stores for support teams, and/or the like.

Figure 7:
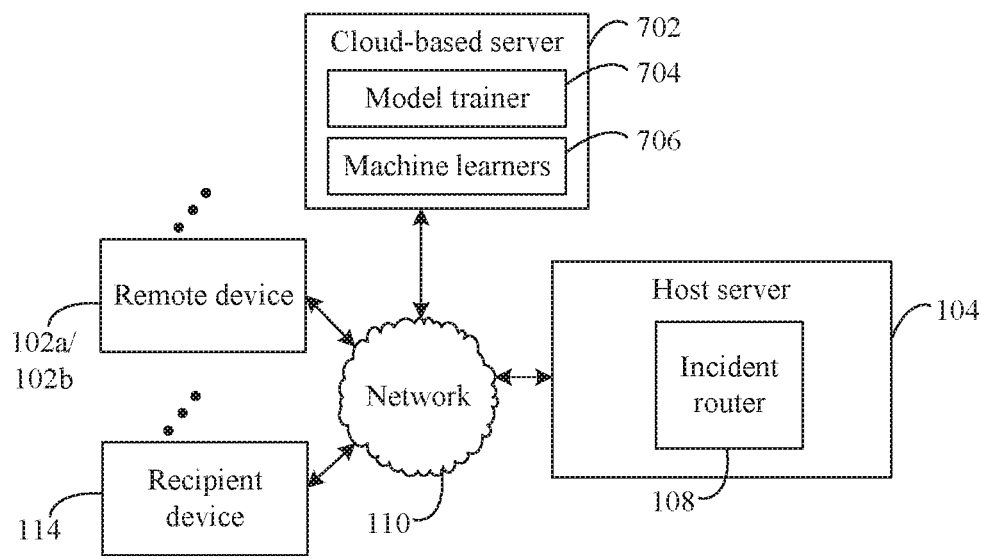
FIG. 7 shows a block diagram of a networked system for intelligent incident routing, according to an example embodiment.

FIG. 7 shows a block diagram of a system 700 for cloud-based model/algorithm training and updating, according to an example embodiment. As illustrated, system 700 may be a further embodiment of system 100 of FIG. 1 (having remote device(s) 102*a/b*, recipient device 114, and host server 104 (with incident router 108) communicatively configured via network 110). System 700 also includes a cloud-based server 702 which may be any type of server computer, including distributed server systems, according to embodiments. Cloud-based server 702 may be communicatively coupled to host sever 104 via network 110, and may reside "in the cloud" as would be understood by one of skill in the relevant art(s) having the benefit of this disclosure.

Cloud-based server 702 includes a model trainer 704 that may be a further embodiment of model trainer 220 of system 200. That is, model trainer 704 may be configured to train and/or update models, such as but not limited to, classification models/algorithms to be used for performing intelligent and automatic routing of incidents. Cloud-based server 702 also includes one or more machine learners 706. Machine learners 706 may include any number of machine learners. While not shown above in system 200 of FIG. 2, it is contemplated herein that computing device 202 may also include one or more machine learners such as machine learners 706 for use in conjunction with model trainer 220.

Classification models/algorithms may be trained offline for deployment and utilization as described herein, according to one or more featurization operations used by incident router 108 of FIG. 1 and/or incident router 208 of FIG. 2 for structuring input data and determining feature vectors, and model trainer 704 may be configured to train models/algorithms using machine learning techniques and instance weighting, according to embodiments.

Figure 8:
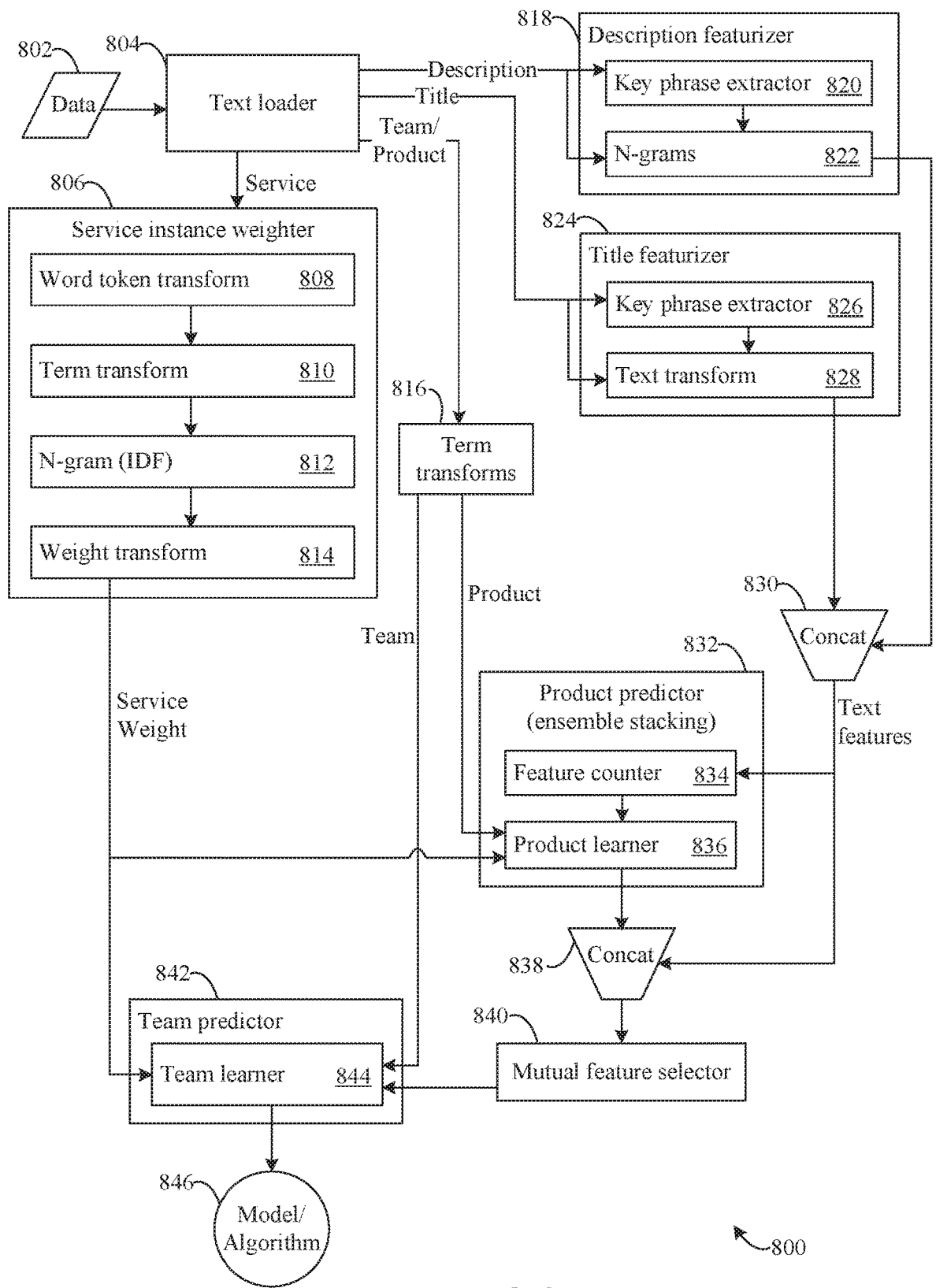
FIG. 8 shows a system flow diagram for generating models/algorithms for intelligent incident routing, according to an example embodiment.

For instance, in FIG. 8, a system flow diagram 800 for generating models/algorithms for intelligent incident routing is shown, according to an embodiment. In embodiments, system flow diagram 800 may also be for updating models/algorithms for intelligent incident routing.

For purposes of illustration, system flow diagram 800 of FIG. 8 is described with respect to model trainer 220 of system 200 in FIG. 2 and model trainer 704 of cloud-based server 702 in FIG. 7, and also with reference to FIG. 5. That is, system flow diagram 800 may be performed by model trainer 220 of system 200 in FIG. 2 and/or model trainer 704 of cloud-based server 702 in FIG. 7, where model trainer 220 and/or model trainer 704 comprise one or more components illustrated in system flow diagram 800.

System flow diagram 800 may operate according to one or more machine learning models/algorithms, such as, but without limitation, ones of the Microsoft ML machine learning models/algorithms package, Microsoft® Azure® machine learning models/algorithms, etc., from Microsoft Corporation of Redmond, Wash. The illustrated embodiment of system flow diagram 800 of FIG. 8 is exemplary in nature and provided for an illustrative basis of discussion for the techniques and embodiments described herein, and is not to be considered limiting. Further structural and operational examples will be apparent to persons skilled in the relevant art(s) based on the following description. System flow diagram 800 is described as follows.

Data 802 is provided to a text loader 804. Data 802 may comprise data and/or information included in feedback for issues (as described herein), issue test cases or examples, prior issues of information providers, and/or the like. Text loader 804 is configured to load text from data 802 to be utilized by system flow diagram 800. For instance, in an exemplary scenario where data 802 comprises an issue such as a prior incident that has been resolved, text loader 804 may load text data related to the incident title, description, service/system, product of the service/system, and/or team (i.e., recipient).

A service instance weighter 806 is configured to receive a service (and/or system) label from text loader 804. Service instance weighter 806 may perform a weight determination for the service/system instance according to a word token transform 808, a term transform 810, an n-gram component 812, and/or a weight transform 814. For example, a service name label is provided to word token transform 808 to generate a tokenized label that is provided to term transform 810 to determine a termed label for the incident. N-gram component 812 may be configured to perform an inverse document frequency (IDF) n-gram transform on the termed label, and provide IDF transform to a weight transform to determine a weighting value (a "service weight") (although other transforms of types other than IDF are contemplated here).

A team label and a product label are provided from text loader 804 to a term transforms component 816 where term transforms are performed on the team label and the product label.

The description (or body) of the incident is provided to a description featurizer 818. Description featurizer 818 may perform featurization operations for the description according to a key phrase extractor 820 (also a keyword extractor) and/or an n-grams component 822. For example, key phrase extractor 820 may be configured to extract key phrases and/or keywords from the description and provide the extracted key phrases and/or keywords to n-grams component 822. Accordingly, semantic-based feature sets may be extracted by key phrase extractor 820 for technical phrases from the corpus of historical issue data for training purposes. That is, feature vectors for training may be generated using the semantic based technical phrases, for each issue used in training, by setting a bit if the key phrase/word present in the issue. Each issue used for training then has a unique feature vector which is used in offline leaning for the model. N-grams component 822 may be configured to perform an n-gram transform based on the extracted key phrases and/or keywords and the description of the incident to generate one or more description features that are provided to concatenator 830.

The title of the incident is provided to a title featurizer 824. Title featurizer 824 may perform featurization operations for the title according to a key phrase extractor 826 (also a keyword extractor) and/or a text transform 828. For instance, key phrase extractor 826 may be configured to extract key phrases and/or keywords from the title and provide the extracted key phrases and/or keywords to text transform 828. Text transform 828 may be configured to perform a text transform based on the extracted key phrases and/or keywords and the title of the incident to generate one or more title features that are also provided to concatenator 830.

It should be noted that additional types of featurization described herein are contemplated as being performed by description featurizer 818 and/or title featurizer 824, according to various embodiments. The featurization operations described with respect to FIG. 8 are exemplary in nature, and fewer, more, additional, and/or alternative featurization operations may be included in embodiments.

Concatenator 830 concatenates the description features and the title features into text features which are provided to a product predictor 832 and a concatenator 838. Product predictor 832 is configured to receive the text features, the service weight from service instance weighter 806, and the transformed product label from transforms component 816. Product predictor 832 may be configured to determine a product prediction according to a feature counter 834 that receives the text features from concatenator 830 and a product learner 836. Feature counter 834 is configured to count the features included in the text features (and/or determine correlation of the text features). Feature counter 834 is also configured to provide its result as an input to product learner 836 which in turn may be configured to train for product prediction scores or product weights based on the service weight (past issue data and features generated therefrom), the transformed product label, and the counted features. Product learner 836 may utilize one or more machine learning algorithms or machine learners, such as machine learners 706 as in FIG. 7, for ensemble stacking to predict the product weights for use by a team learner 844 described below. In such embodiments, API component 228 may be utilized to access the one or more machine learning algorithms concurrently. The product weights are then provided to concatenator 838.

Concatenator 838 concatenates the text features from concatenator 830 and the predicted product weights as candidate features that are then provided to a mutual feature selector 840. Mutual feature selector 840 is configured to determine which of the candidate features are final features for the incident based on the predicted product weights which comprises mutual information measurements between features/variables, i.e., a measurement of the amount of information that one variable has about another variable.

The final features for the incident are then provided to a team predictor 842 (i.e., a recipient predictor) along with the service weight and the transformed team label for determination or update of, a model/algorithm 846 by a team learner 844. Team learner 844 may utilize any type, or combination, of machine-based learner for the final determination of model/algorithm 846, and may utilize ensemble stacking as described above. As an exemplary embodiment, model/algorithm 846 as shown may include a 19-bits hash trigram, a 19-bits hash bi-char-gram, ensemble stacking to predict the product, a key phrase feature comprising three key phrases for issue descriptions, a machine learner component such as one versus all averaged perceptron for product prediction, and a machine learner component such as one versus all fast tree for recipient prediction. It should be noted other types of machine learners, such as equivalent, similar, and/or other machine learners may be used, in embodiments, including without limitation, one versus one machine learners, neural networks, K nearest neighbor learners, and/or the like.

III. Example Mobile Device Implementation

Figure 4B:
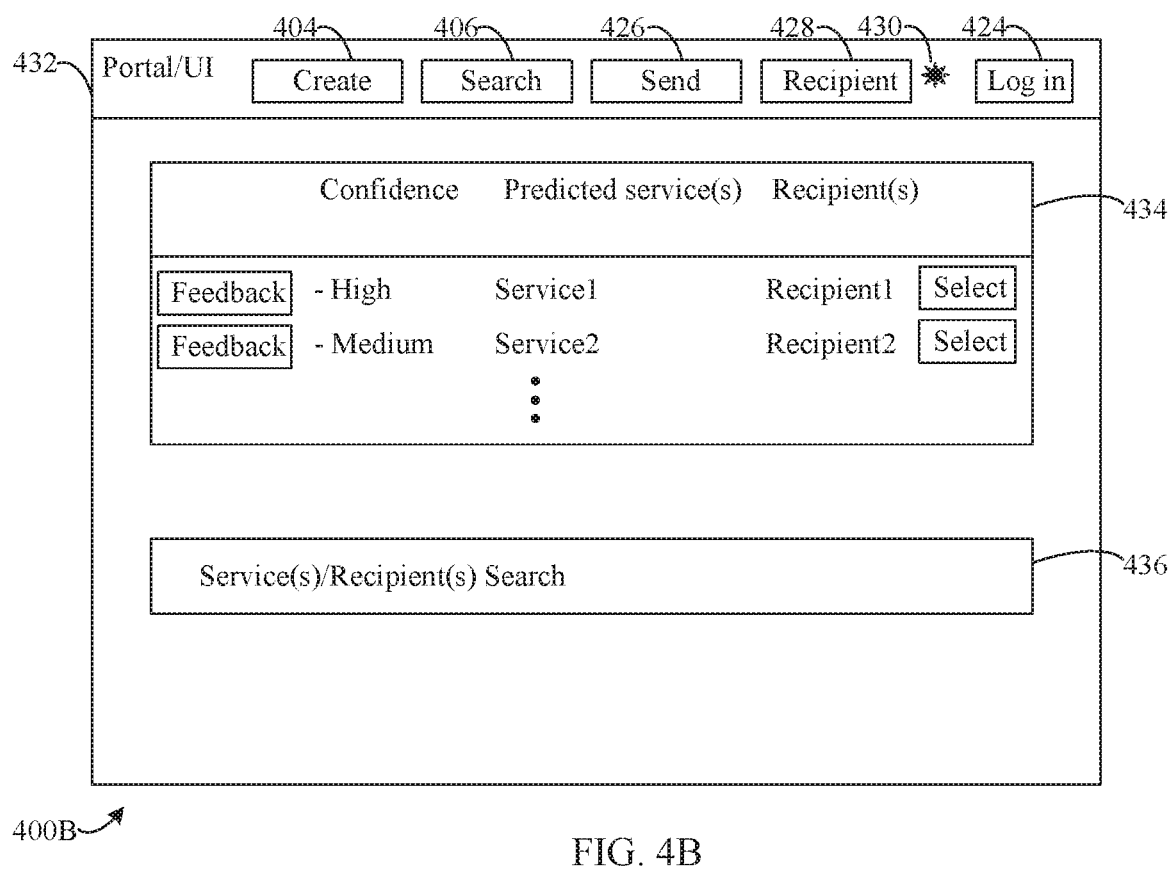
FIG. 4B shows an interface for intelligent incident routing, according to an example embodiment.
Figure 5:
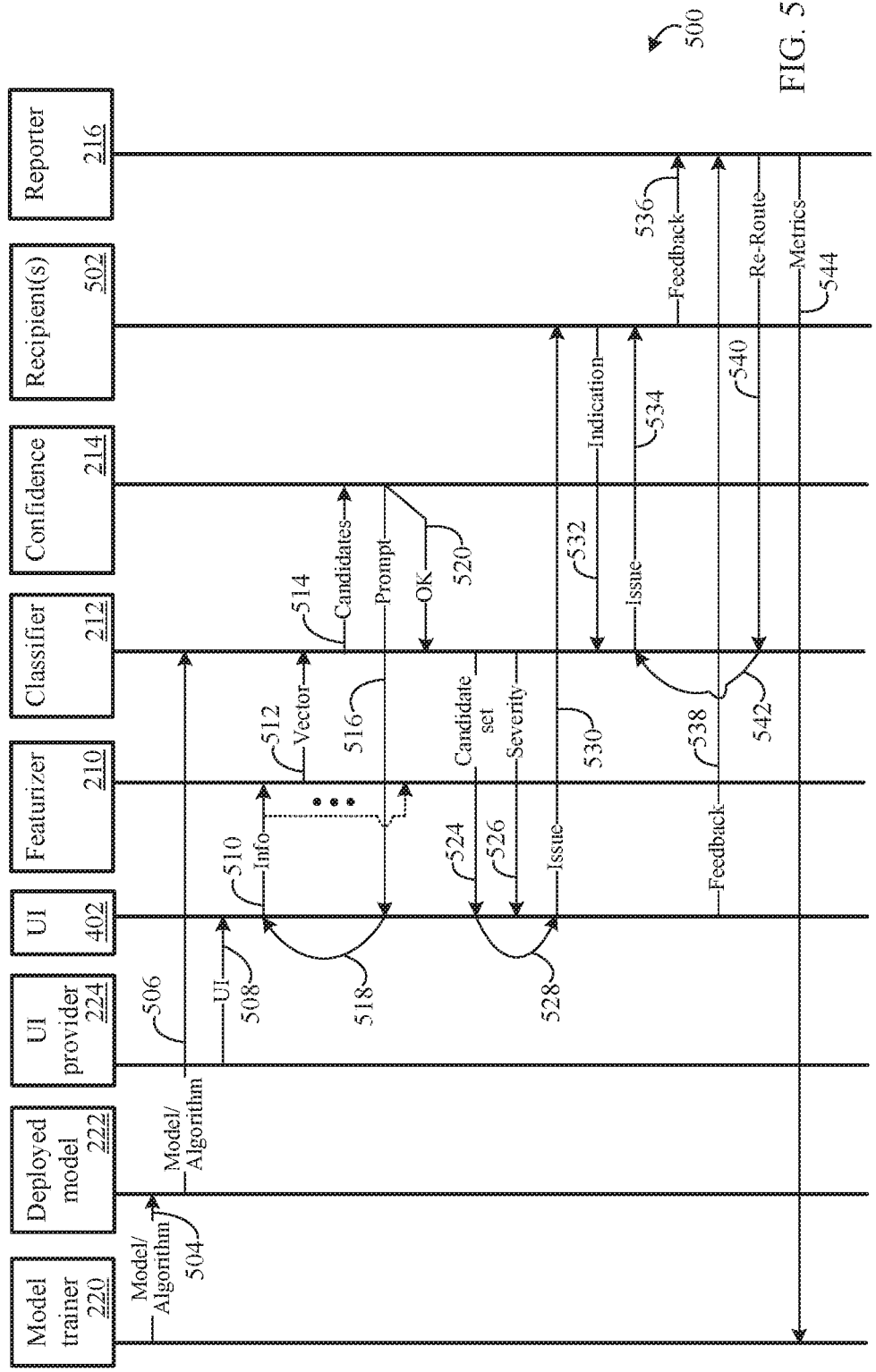
FIG. 5 shows a flow diagram for intelligent incident routing, according to an example embodiment.

Portions of system 100 of FIG. 1, system 200 of FIG. 2, interface 400A of FIG. 4A, interface 400B of FIG. 4B, flow diagram 500 of FIG. 5, system 700 of FIG. 7, system flow diagram 800 of FIG. 8, along with any components and/or subcomponents thereof, as well as the flowcharts described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
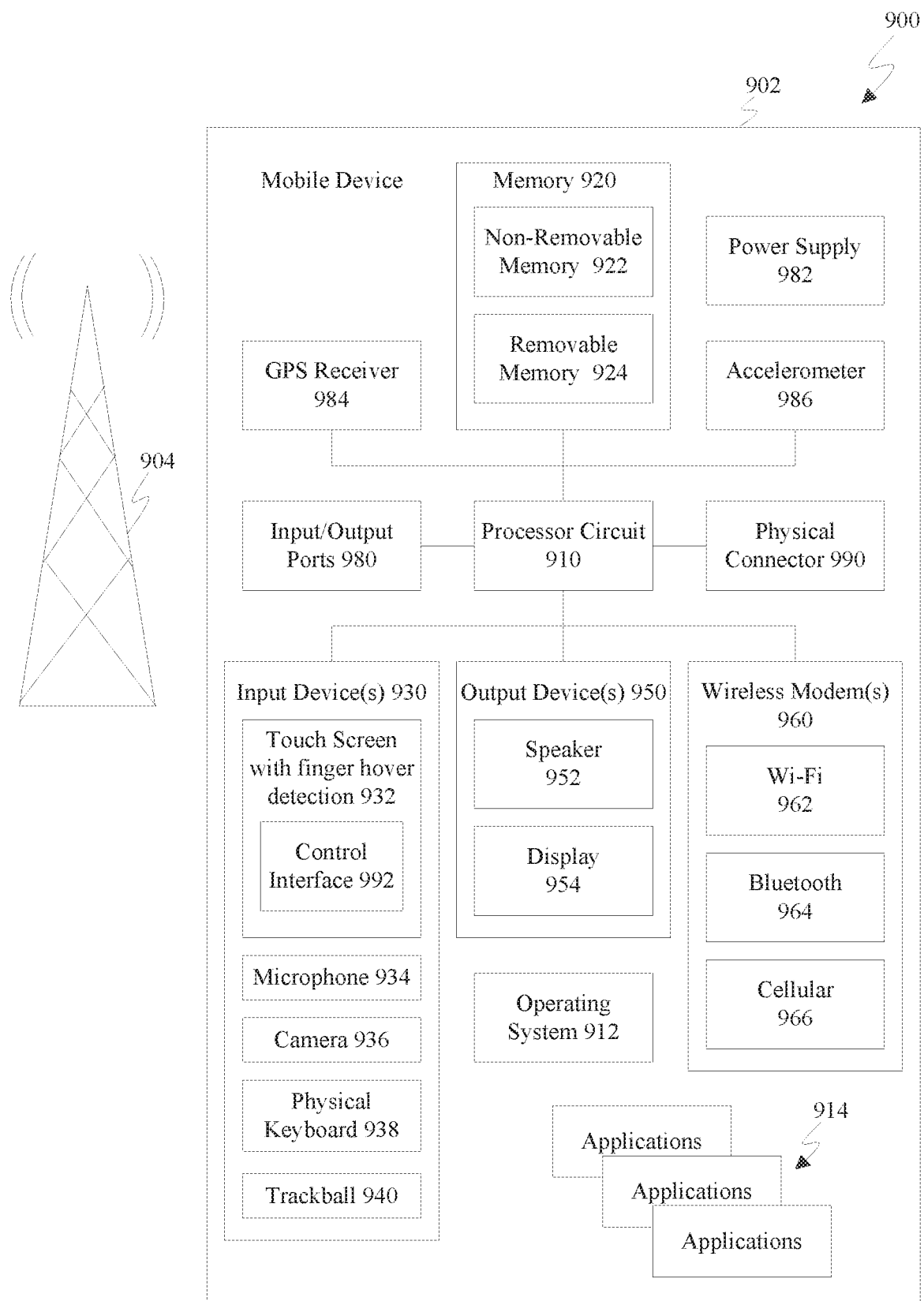
FIG. 9 shows a block diagram of an example mobile device that may be used to implement various example embodiments.

FIG. 9 is a block diagram of an exemplary mobile system 900 that includes a mobile device 902 that may implement embodiments described herein. For example, mobile device 902 may be used to implement any system, client, or device, or components/subcomponents thereof, in the preceding sections. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smart phone, handheld computer, Personal Digital Assistant (PDA), etc.)

and can allow wireless two-way communications with one or more mobile communications networks 904, such as a cellular or satellite network, or with a local area or wide area network.

Mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, web browsers, messaging applications) and any other computing applications (e.g., word processing applications, mapping applications, media player applications).

Mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and application programs 914. Example data can include web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing one or more of system 100 of FIG. 1, system 200 of FIG. 2, interface 400A of FIG. 4A, interface 400B of FIG. 4B, flow diagram 500 of FIG. 5, system 700 of FIG. 7, system flow diagram 800 of FIG. 8, along with any components and/or subcomponents thereof, as well as the flowcharts and/or further examples described herein.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Other possible output devices (not shown) can include piezoelectric or other haptic output devices. Some devices can serve more than one input/output function. For example, touch screen 932 and display 954 can be combined in a single input/output device. Input devices 930 can include a Natural User Interface (NUI).

Wireless modem(s) 960 can be coupled to antenna(s) (not shown) and can support two-way communications between processor 910 and external devices, as is well understood in the art. Modem(s) 960 are shown generically and can include a cellular modem 966 for communicating with the mobile communication network 904 and/or other radio-based modems (e.g., Bluetooth 964 and/or Wi-Fi 962). At least one of wireless modem(s) 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to implement any of the above-described features of flowcharts herein. Computer program logic for performing any of the operations, steps, and/or functions described herein may be stored in memory 920 and executed by processor 910.

IV. Example Processor-Based Computer System Implementation

As noted herein, the embodiments and techniques described herein, including system 100 of FIG. 1, system 200 of FIG. 2, interface 400A of FIG. 4A, interface 400B of FIG. 4B, flow diagram 500 of FIG. 5, system 700 of FIG. 7, system flow diagram 800 of FIG. 8, along with any components and/or subcomponents thereof, as well as the flowcharts and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC).

Figure 10:
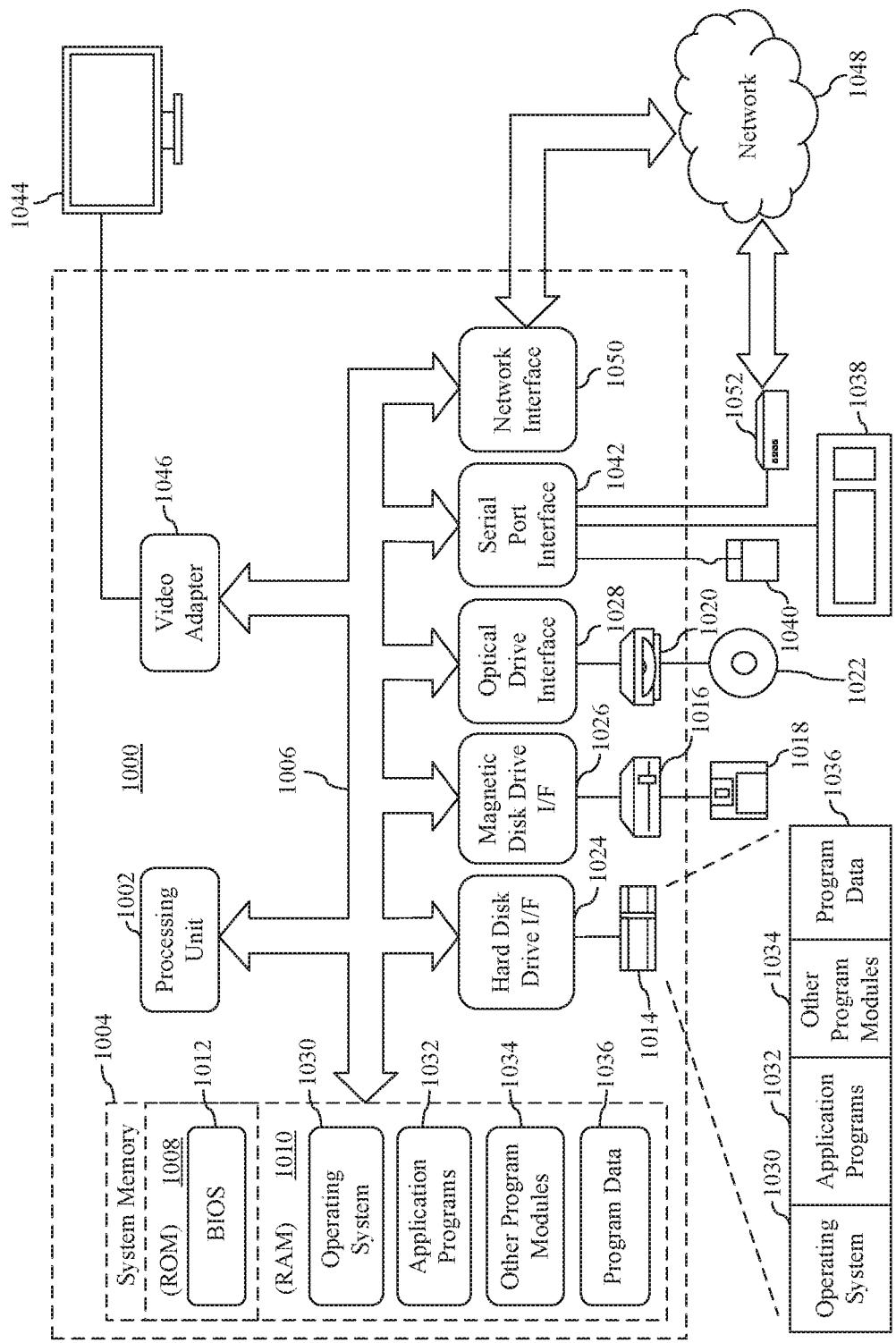
FIG. 10 shows a block diagram of an example processor-based computer system that may be used to implement various example embodiments.

FIG. 10 depicts an example processor-based computer system 1000 that may be used to implement various example embodiments described herein. For example, system 1000 may be used to implement any server, host, system, device (e.g., a remote device), mobile/personal device, etc., as described herein. System 1000 may also be used to implement any of the steps of any of the flowcharts, as described herein. The description of system 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing system 100 of FIG. 1, system 200 of FIG. 2, interface 400A of FIG. 4A, interface 400B of FIG. 4B, flow diagram 500 of FIG. 5, system 700 of FIG. 7, system flow diagram 800 of FIG. 8, along with any components and/or subcomponents thereof, as well as the flowcharts and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media and modulated data signals (do not include communication media and modulated data signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Additional Example Advantages and Embodiments

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

The embodiments and techniques described herein provide improved performance of computing devices and operations executing thereon. By one or more of the techniques and embodiments described, candidate recipients are predicted for intelligent and automatic routing of issues using machine learning algorithms, e.g., incidents, in ways that reduce usage for system resources and also improve system operations. For instance, as noted above, the number of possible recipients for issues may vary greatly from a relatively small number to thousands of support groups, staff members, and/or engineers. The determined set of candidate recipients comprises fewer recipients than all possible recipients, and in embodiments, may comprise only a small fraction of all possible recipients (e.g., 1, 2, 3, . . . , etc. candidates). By intelligently and automatically determining recipients for the routing of issues, load due to mis-routings is significantly reduced for the network utilized by technical support groups and the associated recipients. Additionally, TTE and TTM are reduced thereby improving productivity and operations of systems/services for which issues are reported by information providers. That is, issues for systems/services accessed by information providers may be timely mitigated thus increasing both system/service operational efficiency as well as operational quality.

Additionally, cleaning operations provide initial structure to unstructured information, e.g., textual information, remove extraneous characters and/or redundancies from the information (e.g., tab characters, non-alphanumeric characters, etc.), and simplify the data sets from which feature vectors are generated. Removal or reduction of white space (e.g., continuous white space of a set number of characters, such as 100 characters) condenses the information for feature vector generation, which reduces memory footprints and necessary processing cycles, and also provides for a uniform delimiting of terms in the information. In other words, the techniques and embodiments herein provide for increased algorithm efficiency and decreased algorithm complexity to improve the performance of systems for generating feature vectors, determining algorithm outputs for issues, and providing sets of candidate recipients for intelligent and automatic routing of issues. Smaller memory footprints are provided for by reducing and simplifying input information, and processing cycles required by systems in performance of the techniques described herein are also reduced.

The additional examples described in this Section may be applicable to examples disclosed in any other Section or subsection of this disclosure.

A method performed in a computing device is described herein. The method may be for intelligent and automatic routing of issues using machine learning models/algorithms In an embodiment, the method includes receiving information from an information provider related to an issue associated with at least one of a system or service associated with the information provider, and processing the information according to at least one featurization operation to generate a feature vector. The method also includes providing the feature vector to a machine-learning model that automatically determines a set of candidate recipients, that contains fewer than all possible candidate recipients, based on the feature vector, and providing the set of candidate recipients as one or more options for a selection of a recipient for the information from the set.

In an embodiment of the method, a featurization operation is an operation that transforms at least a portion of the information into one or more representations that describe characteristics of the at least a portion of the information, and the at least one featurization operation includes one or more of a K-means clustering featurization, a keyword featurization, a context-based featurization, a semantic-based featurization, an n-gram featurization, a char-gram featurization, or a feature selection featurization.

In an embodiment, the method includes comparing a confidence level for one or more initial candidate recipients to a threshold value responsive to initiating said processing, and performing said determining of the set of candidate recipients subsequent to and based at least in part on said comparing.

In an embodiment, the method includes determining the confidence level based at least in part on a recipient of one or more prior issues that are similar to the issue. In an embodiment, the method includes providing, based on said comparing, a prompt to the information provider for additional information related to the issue, receiving the additional information from the information provider, and performing said determining of the set of candidate recipients based at least in part on the additional information.

In an embodiment of the method, the information is received via an interface provided to the information provider, and the information comprises at least one of a title for the issue, an environment in which the issue occurred, a severity level of the issue, or a description of the issue.

In an embodiment, the method includes providing, with the set of candidate recipients, a recommendation to the information provider for a severity level of the issue to be included in the information.

In an embodiment, the method includes generating a feedback value for the set of candidate recipients provided to the user, and updating the machine-learning model as an incremental update or as a full model update based on at least one of the feedback value or ensemble stacking.

In an embodiment, the method includes at least one of cleaning unstructured text in the information prior to said processing the information according to the at least one featurization operation, determining the set of candidate recipients further based on a prior issue, or generating an issue template for the information provider based on at least one of a prior issue or a frequency of issue submission. In an embodiment, the issue is an incident associated with the at least one of a system or service associated with the information provider.

In an embodiment, the method includes receiving an indication that the selected candidate recipient was not the correct recipient, providing the feature vector to the machine-learning model to automatically determine a new recipient based on the feature vector and based on the selected candidate recipient not being the correct recipient, and providing the information to the new recipient.

A system is also described herein. The system may be for intelligent and automatic routing of issues using machine learning models/algorithms In an embodiment, the system includes at least one memory configured to store program logic for automatic issue routing, and at least one processor configured to access the memory and to execute the program logic. In the embodiment, the program logic includes featurization logic configured to apply featurization to information according to at least one featurization operation to generate a feature vector, the information received from an information provider and related to an issue related to at least one of a system or service associated with the information provider. The program logic also includes model logic configured to provide the feature vector to a machine-learning model that automatically determines a set of candidate recipients, that contains fewer than all possible candidate recipients, based on the feature vector, and to provide the set of candidate recipients as one or more selectable options for a recipient of the information.

In an embodiment of the system, a featurization operation is an operation that transforms at least a portion of the information into one or more representations that describe characteristics of the at least a portion of the information, and the featurization logic is configured to perform the at least one featurization operation comprising one or more of a K-means clustering featurization, a keyword featurization, a context-based featurization, a semantic-based featurization, an n-gram featurization, a char-gram featurization, or a feature selection featurization.

In an embodiment, the system includes confidence logic configured to compare a confidence level for one or more initial candidate recipients to a threshold value responsive to initiating said processing. In the embodiment, the model logic is configured to determine the set of candidate recipients based at least in part on said comparing.

In an embodiment, the system includes confidence logic configured to compare a confidence level for one or more initial candidate recipients to a threshold value responsive to initiating said processing, and to provide, based on said comparing, a prompt to the information provider for additional information related to the issue. In the embodiment, the model logic is configured to determine the set of candidate recipients based on the additional information received from the information provider. In an embodiment, the system includes confidence logic configured to determine the confidence level based at least in part on a recipient of one or more prior issues that are similar to the issue.

In an embodiment of the system, the information is received via an interface provided to the information provider, and the information comprises at least one of a title for the issue, an environment in which the issue occurred, a severity level of the issue, or a description of the issue.

In an embodiment of the system, the featurization logic is configured to provide, with the set of candidate recipients, a recommendation to the information provider for a severity level of the issue to be included in the information.

In an embodiment, the system includes reporting logic configured to generate a feedback value for the set of candidate recipients provided to the information provider. In the embodiment, the system includes modeling logic configured to train the machine-learning model, and to update the machine-learning model, based on at least one of the feedback value or ensemble stacking, by an incremental update or by a full model update.

In an embodiment of the system, the issue is an incident associated with the at least one of a system or service associated with the information provider. In an embodiment of the system, the machine-learning model is configured to determine the set of candidate recipients further based on a prior issue. In an embodiment of the system the model logic is configured to receive an indication that the selected candidate recipient was not the correct recipient, to provide the feature vector to the machine-learning model to automatically determine a new recipient based on the feature vector and based on the selected recipient not being the correct recipient, and to provide the information to the new recipient.

A computer-readable program storage device, having computer program instructions recorded thereon that, when executed by a processing device, perform a method for automatic issue routing, is also described. The method may be for intelligent and automatic routing of issues using machine learning models/algorithms In an embodiment, the program instructions include featurization instructions configured to apply featurization to information according to at least one featurization operation to generate a feature vector, the information being received from an information provider and related to an issue associated with at least one of a system or service associated with the information provider. In the embodiment, the program instructions also include model instructions configured to provide the feature vector to a machine-learning model that automatically determines a set of candidate recipients based on the feature vector, and to provide the set of candidate recipients as one or more selectable options for a recipient of the information. In the embodiment, the program instructions also include interface instructions configured to provide an interface to the information provider, the interface configured to receive the information from the information provider and to provide the set of candidate recipients.

In an embodiment of the computer-readable program storage device, a featurization operation is an operation that transforms at least a portion of the information into one or more representations that describe characteristics of the at least a portion of the information. In an embodiment of the computer-readable program storage device, the information is received via at least one element of the interface comprising at least one of a title field for the issue, an environment option in which the issue occurred, a severity level option for the issue, or a description field for the issue.

In an embodiment of the computer-readable program storage device, the model instructions are configured to provide the feature vector to the machine-learning model that automatically determines the set of candidate recipients is an empty set based on the feature vector, and the interface instructions are configured to prompt the information provider for additional information corresponding to a label for the issue.

VI. Conclusion

While various examples of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described examples, but should be defined only in accordance with the following claims and their equivalents.

What is claimed is:

1. A system comprising:
at least one memory configured to store program logic for automatic issue routing; and
at least one processor configured to access the memory and to execute the program logic, which causes the at least one processor to:
apply featurization to information according to at least one featurization operation to generate a feature vector, the information received from an information provider and related to an issue related to at least one of a system or service associated with the information provider;
compare a confidence level for one or more initial candidate recipients to a threshold value responsive to the featurization being applied;
provide, based on said comparing, a prompt to the information provider for additional information related to the issue;
provide the feature vector to a machine-learning model that automatically determines a set of candidate recipients of the information, that contains fewer than all possible candidate recipients, based on the feature vector, on the confidence level being compared, and on the additional information received from the information provider; and provide the set of candidate recipients as one or more selectable options from which the information provider is enabled to select a recipient of the information.

2. The system of claim 1, wherein a featurization operation is an operation that transforms at least a portion of the information into one or more representations that describe characteristics of the at least a portion of the information; and
wherein the at least one processor is further caused to perform the at least one featurization operation comprising one or more of:
a K-means clustering featurization;
a keyword featurization;
a context-based featurization;
a semantic-based featurization;
an n-gram featurization;
a char-gram featurization; or
a feature selection featurization.

3. The system of claim 1, wherein the at least one processor is further caused to:
receive an indication that a selected candidate recipient was not the correct recipient;
provide the feature vector to the machine-learning model to automatically determine a new recipient based on the feature vector and based on the selected candidate recipient not being the correct recipient; and
provide the information to the new recipient.

4. The system of claim 1, wherein the at least one processor is further caused to:
determine the confidence level based at least in part on a recipient of one or more prior issues that are similar to the issue.

5. The system of claim 1, wherein the information is received via an interface provided to the information provider; and
wherein the information comprises at least one of:
a title for the issue;
an environment in which the issue occurred;
a severity level of the issue; or
a description of the issue.

6. The system of claim 1, wherein the at least one processor is further caused to:
provide, with the set of candidate recipients, a recommendation to the information provider for a severity level of the issue to be included in the information.

7. The system of claim 1, wherein the at least one processor is further caused to:
generate a feedback value for the set of candidate recipients provided to the information provider;
train the machine-learning model; and
update the machine-learning model, based on at least one of the feedback value or ensemble stacking, by an incremental update or by a full model update.

8. The system of claim 1, further comprising at least one of:
wherein the issue is an incident associated with the at least one of a system or service associated with the information provider;
wherein the machine-learning model is configured to determine the set of candidate recipients further based on a prior issue;
or
wherein the at least one processor is further caused to receive an indication that the selected candidate recipient was not the correct recipient;

provide the feature vector to the machine-learning model to automatically determine a new recipient based on the feature vector and based on the selected recipient not being the correct recipient; and
provide the information to the new recipient.

9. A method performed in a computing device, the method comprising:
receiving, from an information provider, information related to an issue associated with at least one of a system or service associated with the information provider;
processing the information according to at least one featurization operation to generate a feature vector;
providing the feature vector to a machine-learning model that automatically determines a set of candidate recipients, containing fewer than all possible candidate recipients, based on the feature vector;
providing the set of candidate recipients as one or more options for a selection of a recipient for the information from the set;
receiving an indication that the selected candidate recipient was not the correct recipient;
providing the feature vector to the machine-learning model to automatically determine a new recipient based on the feature vector and based on the selected candidate recipient not being the correct recipient; and
providing the information to the new recipient.

10. The method of claim 9, wherein a featurization operation is an operation that transforms at least a portion of the information into one or more representations that describe characteristics of the at least a portion of the information; and
wherein the at least one featurization operation includes one or more of:
a K-means clustering featurization;
a keyword featurization;
a context-based featurization;
a semantic-based featurization;
an n-gram featurization;
a char-gram featurization; or
a feature selection featurization.

11. The method of claim 9, further comprising:
comparing a confidence level for one or more initial candidate recipients to a threshold value responsive to initiating said processing; and
performing said determining of the set of candidate recipients subsequent to and based at least in part on said comparing.

12. The method of claim 11, further comprising at least one of:
determining the confidence level based at least in part on a recipient of one or more prior issues that are similar to the issue;
or
providing, based on said comparing, a prompt to the information provider for additional information related to the issue,
receiving the additional information from the information provider, and
performing said determining of the set of candidate recipients also based at least in part on the additional information.

13. The method of claim 9, wherein the information is received via an interface provided to the information provider; and
wherein the information comprises at least one of:
a title for the issue;

an environment in which the issue occurred;
a severity level of the issue; or
a description of the issue.

14. The method of claim 9, further comprising:
providing, with the set of candidate recipients, a recommendation to the information provider for a severity level of the issue to be included in the information.

15. The method of claim 9, further comprising:
generating a feedback value for the set of candidate recipients provided to the information provider; and
updating the machine-learning model as an incremental update or as a full model update based on at least one of the feedback value or ensemble stacking.

16. The method of claim 9, further comprising at least one of:
cleaning unstructured text in the information prior to said processing the information according to the at least one featurization operation;
determining the set of candidate recipients further based on a prior issue;
generating an issue template for the information provider based on at least one of a prior issue or a frequency of issue submission; or
wherein the issue is an incident associated with the at least one of a system or service associated with the information provider.

17. The method of claim 9, further comprising:
prompting the information provider for additional information corresponding to a label for the issue subsequent to said receiving the indication; and
including the additional information in the feature vector for automatically determining the new recipient.

18. A computer-readable program storage device having computer program instructions recorded thereon that, when executed by a processing device, perform a method for automatic issue routing, the method comprising:
applying featurization to information according to at least one featurization operation to generate a feature vector, the information being received from an information provider and related to an issue associated with at least one of a system or service associated with the information provider;
providing the feature vector to a machine-learning model that automatically determines a set of candidate recipients based on the feature vector, the set being an empty set;
providing an interface to the information provider, the interface configured to receive the information from the information provider and to provide indicia of the empty set of candidate recipients; and
prompting the information provider for additional information corresponding to a label for the issue.

19. The computer-readable program storage device of claim 18, wherein a featurization operation is an operation that transforms at least a portion of the information into one or more representations that describe characteristics of the at least a portion of the information; and
wherein the information is received via at least one element of the interface comprising at least one of:
a title field for the issue;
an environment option in which the issue occurred;
a severity level option for the issue; or
a description field for the issue.

20. The computer-readable program storage device of claim 18, wherein the method further comprises
applying featurization to the additional information according to the at least one featurization operation to generate another feature vector;
providing the other feature vector to the machine-learning model that automatically determines another set of candidate recipients based on the other feature vector; and
providing the other set of candidate recipients as one or more updated selectable options for a recipient of the information.

* * * * *